(12) United States Patent
Walker et al.

(10) Patent No.: US 7,162,434 B1
(45) Date of Patent: Jan. 9, 2007

(54) METHOD AND APPARATUS FOR FACILITATING THE SALE OF SUBSCRIPTIONS TO PERIODICALS

(75) Inventors: Jay S. Walker, Ridgefield, CT (US); Andrew S. Van Luchene, Norwalk, CT (US); Deirdre O'Shea, New York, NY (US); Dean Alderucci, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 646 days.

(21) Appl. No.: 09/260,437

(22) Filed: Mar. 2, 1999

Related U.S. Application Data

(63) Continuation-in-part of application No. 08/841,791, filed on May 5, 1997, and a continuation-in-part of application No. 09/136,147, filed on Aug. 18, 1998, and a continuation-in-part of application No. 09/166,367, filed on Oct. 5, 1998, and a continuation-in-part of application No. 09/219,267, filed on Dec. 23, 1998.

(51) Int. Cl.
*G06F 17/60* (2006.01)
(52) U.S. Cl. ....................................................... 705/14
(58) Field of Classification Search .................. 705/14, 705/26
See application file for complete search history.

(56) References Cited

U.S. PATENT DOCUMENTS

| 3,890,461 A | 6/1975 | Vogelman et al. |
| 4,253,157 A | 2/1981 | Kirschner et al. ........... 364/900 |
| 4,276,598 A | 6/1981 | Inoue et al. |
| 4,484,217 A | 11/1984 | Block et al. |
| 4,723,212 A | 2/1988 | Mindrum et al. |
| 4,833,609 A | 5/1989 | Grulke, Jr. |
| 4,839,507 A | 6/1989 | May ............................ 235/381 |
| 4,876,592 A | 10/1989 | Von Kohorn ................. 358/84 |
| 4,910,672 A | 3/1990 | Off et al. |
| 4,947,028 A | 8/1990 | Gorog |
| 4,982,346 A | 1/1991 | Girouard et al. ............ 364/550 |
| 4,984,155 A | 1/1991 | Geier et al. |
| 5,025,372 A | 6/1991 | Burton et al. ................ 364/406 |

(Continued)

FOREIGN PATENT DOCUMENTS

JP 7-231309 8/1995

(Continued)

OTHER PUBLICATIONS

Fried, Lisa I., "US news rebate offer under fire", Jan. 1, 1991, Folio, v20, n1, p. 28.*

(Continued)

*Primary Examiner*—Jeffrey D. Carlson
(74) *Attorney, Agent, or Firm*—Michael D. Downs

(57) ABSTRACT

A POS terminal receives a signal that indicates an item, for example, via a bar code scanner. The POS terminal ascertains whether the item is associated with an offer for a rebate. If so, a code is generated and output to the customer, such as on a printed receipt. The code is associated with an offer for a rebate in exchange for establishing a subscription to a periodical. If the customer subscribes to a required periodical, he will be credited the amount he paid for the item. Subsequently, the customer requests a subscription to a periodical from a subscription fulfillment house, and provides his code in conjunction with the request. If the code is valid, the customer is provided with a rebate. The rebate may be provided directly by the subscription fulfillment house (e.g. a credit to a credit card account) or may be provided by a merchant (e.g. a discount on a future purchase).

37 Claims, 18 Drawing Sheets

U.S. PATENT DOCUMENTS

| | | | | |
|---|---|---|---|---|
| 5,056,019 | A | | 10/1991 | Schultz et al. ............... 364/405 |
| 5,173,851 | A | | 12/1992 | Off et al. |
| 5,189,607 | A | | 2/1993 | Shirasaki et al. ........... 364/405 |
| 5,202,826 | A | | 4/1993 | McCarthy ................... 364/405 |
| 5,235,415 | A | | 8/1993 | Bonicel et al. |
| 5,250,789 | A | * | 10/1993 | Johnsen ....................... 235/383 |
| 5,287,268 | A | | 2/1994 | McCarthy ................... 364/405 |
| 5,315,093 | A | | 5/1994 | Stewart ....................... 235/381 |
| 5,324,922 | A | | 6/1994 | Roberts ....................... 235/375 |
| 5,353,218 | A | | 10/1994 | DeLapa et al. ............. 336/401 |
| 5,413,341 | A | | 5/1995 | Lieberman |
| 5,415,264 | A | | 5/1995 | Menoud ...................... 194/217 |
| 5,428,606 | A | | 6/1995 | Moskowitz ................. 370/60 |
| 5,450,938 | A | | 9/1995 | Rademacher ............... 194/206 |
| 5,467,269 | A | * | 11/1995 | Flaten ........................ 364/401 |
| 5,521,364 | A | | 5/1996 | Kimura et al. |
| 5,528,490 | A | | 6/1996 | Hill |
| 5,537,314 | A | | 7/1996 | Kanter ....................... 364/406 |
| 5,544,040 | A | | 8/1996 | Gerbaulet |
| 5,612,868 | A | | 3/1997 | Off et al. |
| 5,630,103 | A | | 5/1997 | Smith et al. ................ 395/500 |
| 5,642,484 | A | | 6/1997 | Harrison, III et al. ...... 395/214 |
| 5,655,007 | A | | 8/1997 | McAllister ............... 379/91.01 |
| 5,689,100 | A | | 11/1997 | Carrithers et al. .......... 235/380 |
| 5,694,546 | A | | 12/1997 | Reisman ................... 395/200.9 |
| 5,708,782 | A | | 1/1998 | Larson et al. ............... 395/214 |
| 5,729,693 | A | * | 3/1998 | Holda-Fleck ............... 395/214 |
| 5,759,101 | A | * | 6/1998 | Von Kohorn ............... 463/40 |
| 5,794,210 | A | | 8/1998 | Goldhaber et al. .......... 705/14 |
| 5,812,769 | A | | 9/1998 | Graber et al. ................ 705/26 |
| 5,832,457 | A | | 11/1998 | O'Brien et al. |
| 5,845,259 | A | | 12/1998 | West et al. ................... 705/14 |
| 5,864,822 | A | | 1/1999 | Baker, III .................... 705/14 |
| 5,905,246 | A | * | 5/1999 | Fajkowski ................. 235/375 |
| 5,923,016 | A | | 7/1999 | Fredregill et al. .......... 235/380 |
| 5,924,080 | A | * | 7/1999 | Johnsen ....................... 705/26 |
| 5,926,796 | A | | 7/1999 | Walker et al. ............... 705/16 |
| 5,937,391 | A | | 8/1999 | Ikeda et al. ................... 705/14 |
| 5,956,695 | A | | 9/1999 | Carrithers et al. ........... 705/14 |
| 5,991,739 | A | | 11/1999 | Cupps et al. ................ 705/26 |
| 5,991,740 | A | | 11/1999 | Messer ........................ 705/27 |
| 5,995,942 | A | | 11/1999 | Smith et al. ................. 705/14 |
| 5,999,914 | A | | 12/1999 | Blinn et al. ................... 705/26 |
| 6,014,641 | A | | 1/2000 | Loeb et al. ................... 705/34 |
| 6,016,504 | A | | 1/2000 | Arnold et al. ................ 705/26 |
| 6,021,390 | A | | 2/2000 | Satoh et al. ................... 705/1 |
| 6,024,288 | A | * | 2/2000 | Gottlich et al. ............. 235/493 |
| 6,029,139 | A | | 2/2000 | Cunningham et al. ........ 705/10 |
| 6,029,141 | A | | 2/2000 | Bezos et al. .................. 705/27 |
| 6,061,660 | A | | 5/2000 | Eggleston et al. ............ 705/14 |
| 6,222,914 | B1 | | 4/2001 | McMullin ................... 379/144 |
| 6,229,879 | B1 | | 5/2001 | Walker et al. ................ 379/88 |
| 6,317,723 | B1 | | 11/2001 | Walker et al. ................ 705/16 |
| 6,334,112 | B1 | | 12/2001 | Walker et al. ................ 705/23 |
| 6,334,113 | B1 | | 12/2001 | Walker et al. ................ 705/23 |

FOREIGN PATENT DOCUMENTS

| | | |
|---|---|---|
| WO | WO 98/06050 | 2/1998 |
| WO | WO 98/28699 | 7/1998 |

OTHER PUBLICATIONS

Pat Guy, "A Gift Off the Rack", USA Today, Dec. 19, 1990 at p. 2B.
Liz Horton, "Holiday Gift Subs Up, Some Due to Novel Promotions", Folio Magazine, Feb. 1, 1992 at p. 39.
Barbara Love, "Selling Subscriptions at Newstands", Folio magazine, Jun. 1, 1994 at p. 10.
Barbara Love, "Folio: Plus circulation; Techniques for Managing Magazine Curculation", Folio Magazine, Jan. 1995 at p. 159.
Mark Adams, "Capell Reports Sales Drop at Stands", Mediaweek, Mar. 11, 1996 at p. 27.
"Magazine Subscription Sales Center," Interactive Magazine Sales, Inc., Advertisement.
Howland, Jennifer. "National Distributors: Scanning The Future," Folio: The Magazine for Magazine Management, vol. 14, p. 69, Feb. 1985.
Wood, Wally. "Circulation Marketing: Let Your Magazine Do The Selling," Folio: The Magazine for Magazine Management, vol. 14, p. 78, Jun. 1985.
Reese, Diane. "Revitalizing Single-Copy Sales," Folio: The Magazine for Magazine Management, vol. 15, pp. 84, Feb. 1986.
Joyce, Walter. "Muscular Merchandising; Column," Folio: The Magazine for Magazine Management, vol. 15, p. 124, Jun. 1986.
Donaton, Scott. "Gift Subscriptions Find Retail Niche," Advertising Age, News Section, p. 37, Jul. 16, 1990.
Jaben, Jan. "Magazine Gift-Giving Made Simple at Retail Outlets; Time, Inc., Hearst, Meredith Test Subscriber' Systems Method of Selling Gift Subscriptions; News," Folio's Publishing News, Vol. 3, No. 2, p. 15, Feb. 15, 1991.
"The Super Subs," Precision Marketing, No. 0, vol. 0, p. 23, Oct. 24, 1994.
Cyr, Diane. "Distribution Woes; Declining Newsstand Circulation; Includes Related Article on Preventing Newsstand Fraud," Folio: The Magazine for Magazine Management, vol. 23, No. 19, p. 170, Jan. 1995.
Schnuer, Jenna. "Overnight Options Add To Distribution Mix; Distribution of 'Inside Sports' Magazine," Folio: The Magazine for Magazine Management, vol. 24, No. 4, p. 19, Mar. 1, 1995.
Hochwald, Lambeth. "Postal Blues: Circulators Cope With The Rate Crunch," Folio: The Magazine for Magazine Management, vol. 24, No. 8, p. 54, May 1, 1995.
"Tretorn Offers Magazine Promo," Adweek, New England Edition, May 1, 1995.
Wilson, Steve. "Out of Print—But Not Business; Magazines Move Away From Print In Favor Of Electronic Publishing," Folio: The Magazine for Magazine Management, vol. 24, No. 8, p. 22, May 1, 1995.
"Lottoworld," Mediaweek, vol. 5, No. 19, p. 16(1), May 8, 1995.
Miller, Paul. "Magazine Deal Lacks Catalog Appeal; Brief Article," Folio: The Magazine for Magazine Management, vol. 24, No. 11, p. 30, Jun. 15, 1995.
Graham, Anne. "Nonmember Subs—or Not? Nonmenber Subscriptions To Association Maganzines; Includes Tips From Publishers," Folio: The Magazine for Magazine Management, vol. 24, No. 10, p. 47, Jun. 1, 1995.
Garratt, David. "What Premium on on -Cover Premiums?" Folio: The Magazine for Magazine Management, vol. 24, No. 16, p. 53, Oct. 1, 1995.
Wilson, Steve. "Directory Assistance: A Buyer's Guide Can Give You A Big Boost In Revenue And Attract New Advertisers and Subscribers," Folio: The Magazine for Magazine Management, vol. 24, No. 16, p. 40, Oct. 1, 1995.
"HFS Incorporated And Hachette Filipacchi Magazines; Announce Lauch of Centry 21 House & Home Magazine; No. 1 Real Estate Company and Leading Publisher of Home-Related Magazines to use Unparalleled Century 21 (R) Brand Awareness and Customer Base in Developing Magazine with Broad Consumer Appeal; Latest in Series of Century 21," Business Wire, Nov. 20, 1995.
Hochwald, Lambeth. "Circulation Secrets: Nine Steps to a Successful Circulation Launch Strategy Includes List of Resources," Folio: The Magazine for Magazine Management, vol. 25, No. 2, p. 53, Feb. 1, 1996.
Kerwin, Ann Marie. "Notably At The Newsstand: Instyle, Financial World Push For Greater Single-Copy Sales," Inside Media, vol. 8, No. 3, p. 26, Feb. 7, 1996.
Schnuer, Jenna. "A World Without Magazines? Consumers Weigh In Survey of Consumers Indicates That Magazines Are Most Dispensable Form of Communication For 37% Of Respondents," Folio: The Magazine for Magazine Management, vol. 25, No. 9, p. 16, Jun. 1, 1996.
"Magazine Subscription Sales Center - Where buying subscriptions is easy!", Customer Service Information, Interactive Magazine Sales, Inc, Email: aim@panix com.

"Phoenix Papers to Sell Merchandise to Build Awareness", Editor & Publisher, Sep. 17, 1988, vol. 121, Issue 38, pg. 23, pg. 23, ISSN: 0013-094X.

Carlson, Lynn, "Decreasing Your Direct-Mail Costs", Folio: The Magazine for Magazine Management, Sep. 1, 1992, vol. 21, Issue 9, pp. 81-82, ISSN: 0046-4333.

Hochwald, Lambeth, "Sub sources that break with tradition", Folio: The Magazine for Magazine Management, May 1, 1994, vol. 23, Issue 8, pp. 46-48, ISSN: 0046-4333.

Kelly, Keith J., "Hearst opens a cyberspace newsstand", Advertising Age, Jan. 30, 1995, vol. 66, Issue 5, pg. 14, ISSN: 0001-8899.

Kelly, Keith, J., "Publishers pine for cyber-profits", Advertising Age, Mar. 13, 1995, vol. 66, Issue 11, p. S-22, ISSN: 0001-8899.

"Hearst Corporation launches 'The Multimedia Newsstand'", Link-Up, Mar./Apr. 1995, vol. 12, Issue 2, pp. 1, 36, ISSN: 0739-988X.

Hodges, Jane, "'WSJ' puts squeeze on Web subscriptions", Advertising Age, Apr. 29, 1996, vol. 67, Issue 18, p. 34, ISSN: 0001-8899.

Tedesco, Richard, "Time launches Net subscription service", Broadcasting & Cable, Nov. 11, 1996, vol. 126, Issue 47, p. 65, ISSN: 1068-6827.

Case, Tony, "The electronic newsstand branches out", Folio: The Magazine for Magazine Management, Apr. 1, 1997, vol. 26, Issue 5, p. 13, ISSN: 0046-4333.

Krol, Carol, "Magazine site to focus on commerce", Advertising Age, Aug. 18, 1997, vol. 68, Issue 33, p. 18, ISSN: 0001-8899.

Manly, Lorne, "A Newsstand for the Electronic Age?", ABI/Inform, Global Edition, Sep. 15, 1993, p. 17.

Lacher, Lisa, "Coupon Gimmick Registers Profits", Business Record, Dec. 7, 1987, p. 1.

Steven Lawrence, "Hypermarket Challenge", Computerworld, Dec. 19, 1988, p. 25.

"Safeway Introduces Store-Generated Coupons", PR Newswire, May 1, 1990.

Blattenberg, Robert C. et al., "Interactive Marketing: Exploiting the Age of Addressability", Sloan Management Review, Sep. 22, 1991, p. 5.

McDowell, Bill, "Frequency Marketing Builds Repeat Business; Management", Building Supply Home Centers, Aug. 1993, No. 2, vol. 165, p. 96.

McKinney, Jeff, "Merchants Program Could Pay Off for Provident", The Cincinnati Enquirer, Mar. 24, 1996, Financial Section, p. 2.

Wagner, Jim, "Cameras Tell Mall What Door You Use, How Often You Go", Albuquerque Tribune, Aug. 9, 1996, Evening Section, p. A3.

Fickenscher, Lisa, "AMEX to Start Rewards Program with Discounts on Merchandise", The American Banker, Oct. 18, 1996, Credit/Debit/ATMs, p. 10.

Fitzgerald, Kate, "AMEX Program Moves Loyalty to Next Level: Custom Extras Finds A Medium Customers Can't Ignore, Billing Statements", Advertising Age, Nov. 4, 1996, News Section, p. 2.

"Tecmark Reward Terminal", Tecmark Services, Inc., (http //www tecmarkinc com/terminal htm), download date: Mar. 20, 1997.

Fickenscher, Lisa, "Merchant: American Express Seeks to Mine Its Data on Cardholder Spending Patterns", The American Banker, Mar. 24, 1997, Credit/Debit/ATMs Section, p. 20.

"Dispensing the Future", Electronic Payments International, May 1997, Feature Section, p. 12.

"Industry Briefs", Card News, Jun. 9, 1997, vo. 12, No. 11.

Hoeschen, Brad, "Brookfield Square Hopes Mall Card Strikes a Chord", Business Journal - Milwaukee, Sep. 12, 1997, vo. 14, No. 50, p. 19.

"Acxiom Case-in-Pont Case Study - Bloomingdale's", Acxiom, (http www acxiom com-cs-b htm), download date: Sep. 23, 1997.

"NCR 7452 Workstation - Beyond Traditional POS", NCR Corporation, (http //www ncr com/product/retail/products/catalog/7452 shtm), download date: Sep. 23, 1997.

"New Partners, More Exciting Rewards: The Membership Rewards Program for 1998", American Express, (http www Americanexpress com/rewards/news/docs/1998new_mr shtml), download date: Mar. 12, 1998.

Hemsley, Steven, "Research and Destroy; Point-of-Purchase Research Provides Brand Managers with Essential Information About Customer Trends and Enables Them to Achieve the Maximum from their Displays", Marketing Week, Apr. 16, 1998, Point-of-Purchase Selection, pp. 33-36.

"MyPoints Universal Rewards Currency", MotivationNet, Inc. Brochure, Apr. 1998.

"Wells Park Group Launches 'V.I.P. Rewards'; the Most Comprehensive Relationship Marketing Program Ever Created by a Mall Developer", Business Wire, May 19, 1998.

Amato-McCoy, Deena, "Co-Branded ACME Credit Card Rewards Loyal Users", Supermarket News, Jun. 15, 1998, pg. 17.

"ACME Markets, U.S. Bancorp Debut Visa Rewards Card", Card News, Jun. 22, 1998, vol. 13, No. 12.

Rubenstein, Ed, "Prepaid Program Lets Galleria Guests Dine 'A La Card'", Nations Restaurant News, Jun. 29, 1998, p. 43.

"DataCard Partners with CSI to Offer Card-Based Loyalty Solution to Merchants", Business Wire, Jul. 9, 1998.

Albright, Mark, "Grocery Savings via Web Coupons", St. Petersburg Times, Jul. 22, 1998, Wednesday O South Pinellas Edition, Business Section, p. 1E.

"Reaching Out in New Directions", Introducing U$A Value Exchange, First Data Corporation, Brochure.

"Frequent Shopper Programs are Taking Off", Grocery Marketing, vo. 63, No. 1, p. 54, Jan. 1997.

Campos, Frellie, "Discount Shopping Program Extended to Residents", Pacific Business News, vol. 36, Issue 27, Sep. 21, 1998.

"Global Second-Generation, and Frequent-Buyer Set New Trends", Marketing News, vo. 19, No. 12, p. 18, Jun. 7, 1985.

McIntyre, Faye, "Small Businesses May Prefer Alternatives to Advertising", South Dakota Business Review, vo. 47, No. 4, Jun. 1989.

"Staples The Office Superstore to Participate in Visa 'Rewards for Your Home' Promotion; Savings Will be Offered to Thousands of Visa and Staples Customers", Business Wire, Dialog File 621, Mar. 25, 1996.

"Retailers in Small N.D. Town Join Forces", Tire Business, vol. 14, No. 2, p. 10, Apr. 29, 1996.

Tedesco, Richard "Pactel pushes Net access." Broadcasting & Cable, Jun. 3, 1996, pp. 64-65.

Colman, Price "Cross-marketing cuts cable bills." Broadcasting & Cable, Jul. 15, 1996, p. 44.

Fleming et al. "European Banks, Insurance Firms Cross Into Each Other's Territory." Wall Street Journal, (Europe) Feb. 20, 1991, p. 9.

* cited by examiner

|  | MERCHANT IDENTIFIER 520 | MERCHANT NAME 522 | MERCHANT ACCOUNT IDENTIFIER 524 | AMOUNT OWED 526 |
|---|---|---|---|---|
| 502 → | M 001 | MERCHANT X | MASTERCARD 2222-2222-2222-2222 | $114.00 |
| 504 → | M 002 | MERCHANT Y | BANK & TRUST ACCOUNT NO. 1234567891 | $0.00 |
| 506 → | M 003 | MERCHANT Z | INTERNAL ACCOUNT NO. A 00340 | $0.00 |
| 508 → | M 004 | MERCHANT Q | AMERICAN EXPRESS 3333-3333-3333-3333 | $89.95 |

| REBATE RULE IDENTIFIER 620 | ITEM IDENTIFIER 622 | REBATE AMOUNT 624 | REQUIRED SUBSCRIPTION 626 | REBATE MESSAGE 628 | CONTACT IDENTIFIER 630 |
|---|---|---|---|---|---|
| R 01 | 12340 | ITEM PRICE | NEWS MAGAZINE, AT LEAST 12 MONTH TERM | THIS ISSUE IS FREE WITH A ONE-YEAR SUBSCRIPTION TO NEWS MAGAZINE. CALL 1-800-NEWSUBS FOR YOUR SUBSCRIPTION AND REBATE | 1-800-NEWSUBS |
| R 02 | 12340 | ITEM PRICE | ANY MAGAZINE | THIS ISSUE IS FREE WITH A SUBSCRIPTION TO ANY MAGAZINE. CALL 1-800-NEWSUBS FOR YOUR SUBSCRIPTION AND REBATE | 1-800-NEWSUBS |
| R 03 | 12341 | ITEM PRICE | PARENTING MAGAZINE, ANY TERM | WE'LL REBATE THE PRICE OF YOUR BABY FORMULA IF YOU CALL 1-800 NEWSUBS AND SUBSCRIBE TO PARENTING MAGAZINE | 1-800-NEWSUBS |
| R 04 | 12341 | ITEM PRICE + $1.00 | PARENTING MAGAZINE AND ONE OTHER MAGAZINE | WE'LL PAY YOU THE PRICE OF THE BABY FORMULA PLUS ONE DOLLAR. JUST CALL 1800-NEWSUBS AND SUBSCRIBE TO PARENTING MAGAZINE AND ONE OTHER MAGAZINE | 1-800-NEWSUBS |

FIG. 6

| CODE 820 | ISSUED? 822 | EXPIRATION DATE 824 | SUBSCRIPTION PURCHASED? 826 | REDEEMED? 828 | ISSUING MERCHANT 830 | REBATE RULE IDENTIFIER 832 | REBATE AMOUNT 834 |
|---|---|---|---|---|---|---|---|
| ABCD1234567 | NOT ISSUED | – | – | – | | | |
| 13579842 | ISSUED 5:41 PM 8/9/2001 | 8/23/2001 | NO | – | M 004 | R 01 | $3.50 |
| 998877665 | ISSUED 6:03 PM 8/9/2001 | 8/30/2001 | PURCHASED 11:23 AM 8/21/2001 | NO | M 001 | R 02 | $2.95 |
| 24680246 | ISSUED 7:11 PM 8/9/2001 | 8/30/2001 | PURCHASED 9:07 AM 8/29/2001 | REDEEMED 1:01 PM 8/31/2001 | M 001 | R 03 | $6.75 |
| | | | | | M 002 | R 04 | $7.75 |

FIG. 8

| CREDIT CARD ACCOUNT NUMBER 1111-1111-1111-1111 1002 | | |
|---|---|---|
| DESCRIPTION 1020 | TRANSACTION DATE 1022 | AMOUNT 1024 |
| MERCHANT Q | 7/4/2001 | $22.89 |
| SUBSCRIPTION: NEWS MAGAZINE | 7/29/2001 | $12.95 |
| REBATE: ONE ISSUE NEWS MAGAZINE PURCHASED AT MERCHANT Q | 7/29/2001 | - $3.50 |

1004 → (MERCHANT Q row)
1006 → (SUBSCRIPTION row)
1008 → (REBATE row)
1000

FIG. 10

METHOD AND APPARATUS FOR FACILITATING THE SALE OF SUBSCRIPTIONS TO PERIODICALS

The present application is a continuation-in-part application of U.S. patent application Ser. No. 08/841,791, entitled "METHOD AND APPARATUS FOR SELLING SUBSCRIPTIONS TO PERIODICALS IN A RETAIL ENVIRONMENT", filed on May 5, 1997; which issued as U.S. Pat. No. 5,926,796 on Jul. 20, 1999 and a continuation-in-part of U.S. Pat. application No. 09/136,147, entitled "METHOD AND APPARATUS FOR ESTABLISHING A SUBSCRIPTION TO A PERIODICAL", filed on Aug. 18, 1998, now abandoned and a continuation-in-part of U.S. Pat. application No. 09/166,367, entitled "METHOD AND APPARATUS FOR PROVIDING A DISCOUNT TO A CUSTOMER THAT PARTICIPATES IN TRANSCACTIONS AT A PLURALITY OF MERCHANTS", filed on Oct. 5, 1998; now abandoned and a continuation-in-part of co-pending U.S. Pat. application No. 09/219,267, entitled "METHOD AND APPARATUS FOR FACILITATING ELECTRONIC COMMERCE THROUGH PROVIDING CROSS-BENEFITS DURING A TRANSACTION", filed on Dec. 23, 1998, each assigned to the assignee of the present invention and each incorporated by reference as part of the present disclosure.

FIELD OF THE INVENTION

The present invention relates to methods and apparatus for facilitating the sale of subscriptions to periodicals.

BACKGROUND OF THE INVENTION

Each year over one billion magazine issues are sold through over 50,000 retail stores in the United States. The "cover price" (cost of an issue) at a typical retail store ("retailer") is often two or three times higher than the pro rata price of an issue provided in connection with a subscription to the periodical. Despite the higher prices, consumers are willing to purchase issues from retail stores because of convenience and timeliness.

Some consumers decide to forgo the advantages of issues purchased at retail stores in favor of subscriptions to periodicals, which are more cost effective. However, many inconveniences deter purchasers of single issues at retail stores from subscribing to the periodicals. For example, if a customer purchases a subscription, the retailer is deprived of the revenue he might have gained if the customer were to purchase the issues of the periodical. Furthermore, the customer cannot pay for a subscription with cash. The consumer must either mail a check or make a telephone call to initiate a subscription and provide a credit card number.

Retailers are burdened by the need to manage issues of periodicals. Retailers receive issues from a fulfillment house. Typically, the retailer is unable to sell approximately half of the issues, and must return them at substantial cost to the retailer. It is very difficult to predict which issues will sell and the quantities thereof. If too many issues are ordered, they must be returned. If too few issues are ordered, the retailer does not realize the profit it could have realized. Consequently, it is difficult or impossible to accurately stock the correct quantities of various issues.

It would be advantageous to provide a method and apparatus for facilitating the sale of subscriptions to periodicals.

SUMMARY OF THE INVENTION

It is an object of the present invention to provide a method and apparatus for facilitating the sale of subscriptions to periodicals.

In accordance with the present invention, a POS terminal receives a signal that indicates an item, for example, via a bar code scanner. The POS terminal ascertains whether the item is associated with an offer for a rebate. If so, a code is generated and output to the customer, such as on a printed receipt. The code is associated with an offer for a rebate in exchange for establishing a subscription to a periodical. If the customer subscribes to a required periodical, he will be credited the amount he paid for the item.

Subsequently, the customer requests a subscription to a periodical from a subscription fulfillment house, and provides his code in conjunction with the request. If the code is valid, the customer is provided with a rebate. The rebate may be provided directly by the subscription fulfillment house (e.g. a credit to a credit card account) or may be provided by a merchant (e.g. a discount on a future purchase).

BRIEF DESCRIPTION OF THE DRAWINGS

FIG. 5 is a tabular representation of a merchant database of the subscription fulfillment house server of FIG. 3.

FIG. 6 is a tabular representation of a rebate rule database of the subscription fulfillment house server of FIG. 3.

FIG. 8 is a tabular representation of another embodiment of the code database of the subscription fulfillment house server of FIG. 3.

FIG. 10 is a tabular representation of charges and credits made to an exemplary credit card account.

DETAILED DESCRIPTION OF THE PREFERRED EMBODIMENTS

Applicants have recognized that a customer purchasing an issue of a periodical may be provided with an incentive to subsequently purchase a subscription. In exchange for subscribing to the periodical, the customer receives a rebate. In one embodiment, the cost of the issue is paid to the customer. The subscription fulfillment house that processes the subscription request may fund the rebate as payment for acquiring a new subscriber. In one embodiment, the subscription fulfillment house pays the customer the rebate amount directly. In another embodiment, the subscription fulfillment house arranges for a merchant to pay the customer the rebate amount. The purchase of other items besides issues of periodicals may likewise prompt an offer to the customer that provides an incentive to purchase a subscription.

Figure 1:
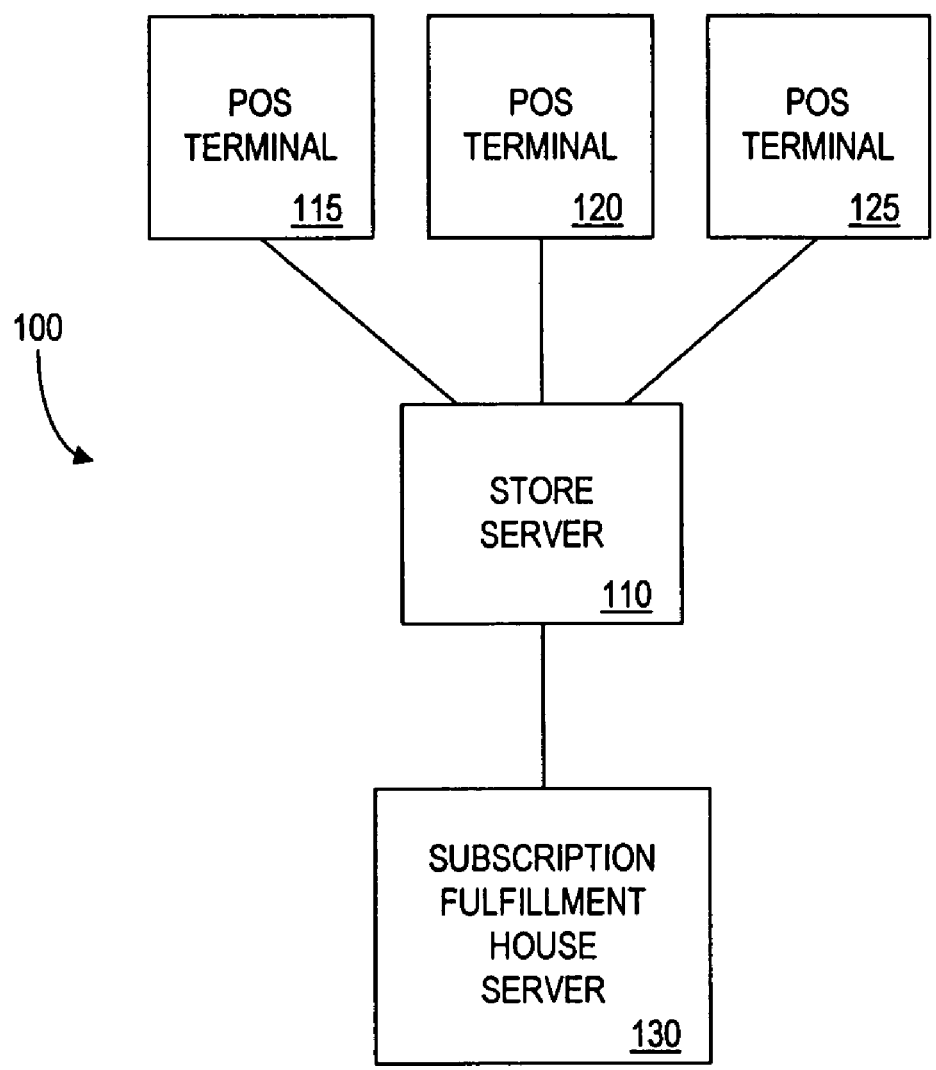
FIG. 1 is a schematic illustration of an apparatus for facilitating the sale of subscriptions to periodicals in accordance with the present invention.

Referring to FIG. 1, an apparatus 100 includes a store server 110 that is in communication with point of sale (POS) terminals 115, 120 and 125 and with a subscription fulfillment house server 130. The store server 110 may communicate with the POS terminals 115, 120 and 125 via an appropriate network such as a local area network (LAN). The POS terminals 115, 120 and 125 may be, for example, the NCR 7454 manufactured by NCR Corporation or the IBM 4683 manufactured by International Business Machines. The POS terminals 115, 120 and 125 perform such processes as calculating the total price of a purchase (goods or services) and calculating the amount of change due to a customer. The POS terminals 115, 120 and 125 may furthermore track purchases made and adjust databases of inventory accordingly. Although three POS terminals are shown in FIG. 1, any number of POS terminals may be in communication with the store server 110 without departing from the spirit and scope of the present invention. Each of the POS terminals 115, 120 and 125 may be located in the same store, in different stores of a chain of stores, or in other locations.

The store server 110 directs the operation of, stores data from and transmits data to the POS terminals 115, 120 and 125. The store server 110 may itself be a POS terminal, as described herein, or may be another computing device that can communicate with one or more POS terminals. The store server 110 may perform many of the processes described below, especially those processes that are performed for more than one POS terminal. The store server 110 may furthermore store data, such as an inventory database, that is to be shared by the POS terminals 115, 120 and 125. Similarly, data described herein as stored on the store server 110 may be stored on the POS terminals 115, 120 and 125, as appropriate. There may be any number of store servers in communication with the subscription fulfillment house server 130.

Each store server would typically be associated with a different merchant.

The store server 110 may communicate with the subscription fulfillment house server 130 via an appropriate network such as the Internet or a proprietary wide area network (WAN). The subscription fulfillment house server 130 may be a computing device, such as one based on the Intel® Pentium® microprocessor, that processes requests for subscriptions on behalf of the subscription fulfillment house. Possible hardware configurations for the subscription fulfillment house server 130 will be apparent to those skilled in the art.

Figure 2A:
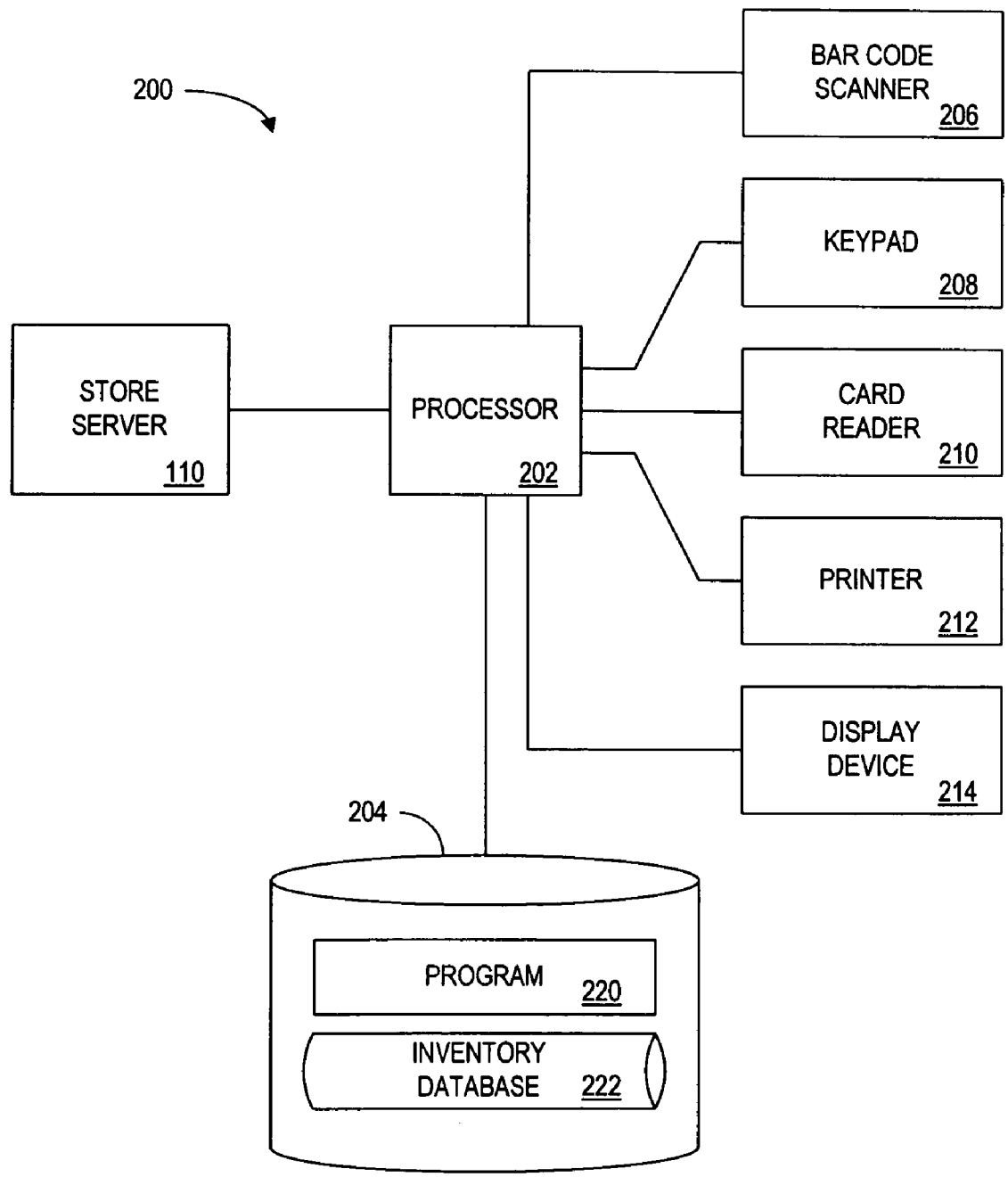
FIG. 2A is a schematic illustration of an embodiment of a POS terminal of the apparatus of FIG. 1.

FIG. 2A illustrates an embodiment of a POS terminal 200 that is descriptive of any or all of the POS terminals 115, 120 and 125 (FIG. 1). The POS terminal 200 comprises a processor 202, such as one or more Pentium® microprocessors. The processor 202 is in communication with a data storage device 204. The data storage device 204 comprises an appropriate combination of magnetic, optical and/or semiconductor memory, and may include Random Access Memory (RAM), Read-Only Memory (ROM) and/or a hard disk. The processor 202 and the storage device 204 may each be (i) located entirely within a single computer or other computing device; (ii) connected to each other by a remote communication medium, such as a serial port cable, telephone line or radio frequency transceiver; or (iii) a combination thereof. In one embodiment, the POS terminal 200 may comprise one or more computers that are connected to a remote server computer for maintaining databases.

The processor 202 may be in communication with one or more input devices. An optical bar code scanner 206 is operative to read bar codes and transmit signals indicative of those bar codes to the processor 202. As is known in the art, a bar code is a series of vertical bars of varying widths printed on consumer product packages and other retail items and used to allow a computer to identify those products. The optical bar code scanner 206, such as those manufactured by symbol technologies, is an optical device that uses a laser beam to read and interpret bar codes. A keypad 208 is operative to transmit input signals, such as signals indicative of actuated keys, to the processor 202. A card reader 210 is operative to read cards such as magnetic strip cards that have magnetizable strips or surfaces on which data may be recorded. The card reader in turn transmits signals representing such read data to the processor 202.

The processor 202 may likewise be in communication with one or more output devices. A printer 212 is operative to register indicia on paper or other material, thereby printing receipts and coupons, as controlled by the processor 202. A display device 214 comprises a video monitor or other device operative to display at least alphanumeric characters to the customer and/or cashier as directed by the processor 202.

Many types of input devices and output devices are known to those skilled in the art and need not be described in detail herein.

The data storage device 204 stores a program 220 for controlling the processor 202. The processor 202 performs instructions of the program 220 and thereby operates in accordance with the present invention, particularly in accordance with the methods described in detail herein. The program 220 furthermore includes program elements that may be necessary, such as an operating system and "device drivers", for allowing the processor 202 to interface with computer peripheral devices such as input devices and output devices. Appropriate device drivers and other necessary program elements are known to those skilled in the art and need not be described in detail herein.

The storage device 204 also stores an inventory database 222. The inventory database 222 is described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Figure 2B:
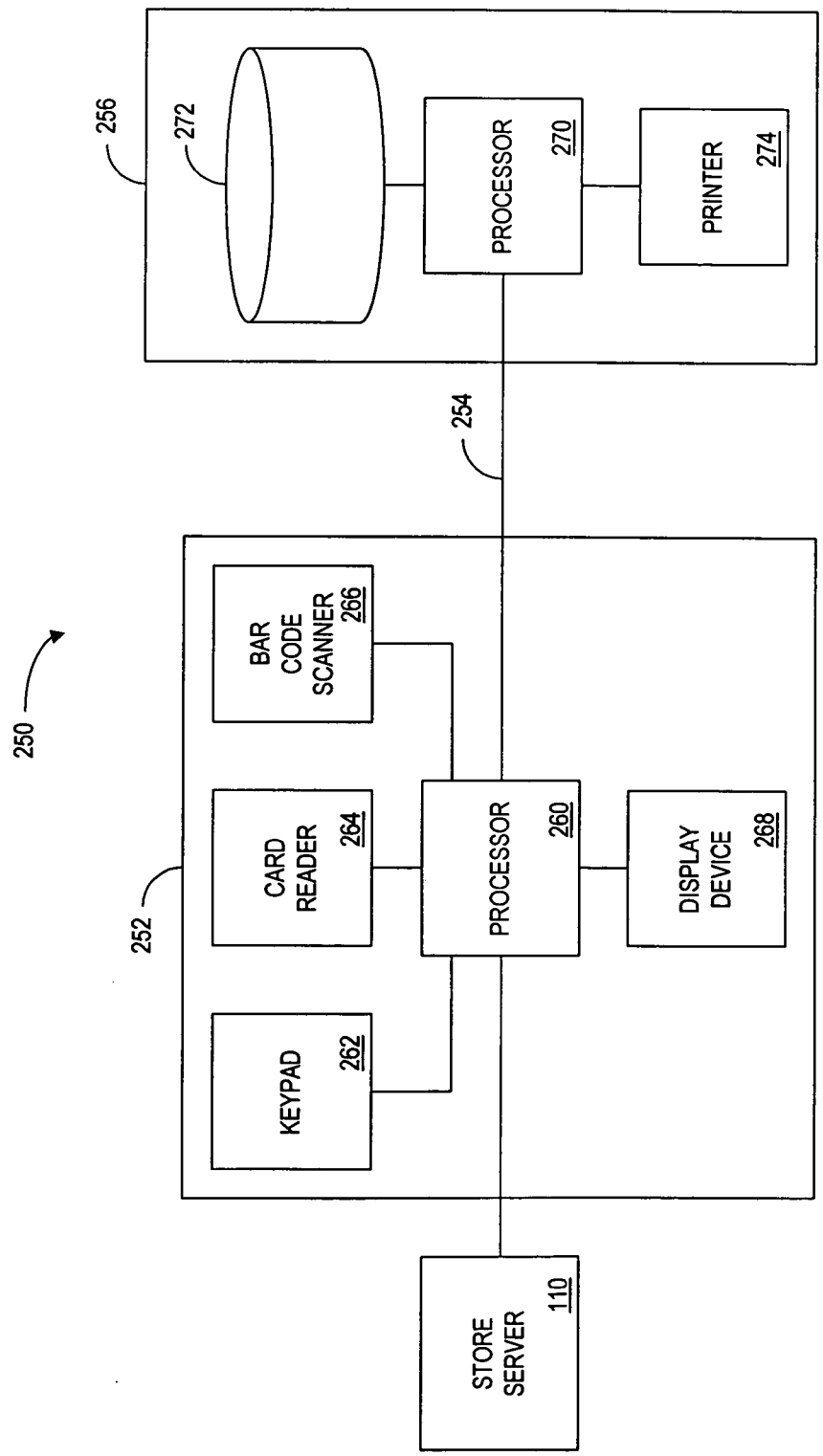
FIG. 2B is a schematic illustration of another embodiment of a POS terminal of the apparatus of FIG. 1.

FIG. 2B illustrates another embodiment of a POS terminal 250 that is descriptive of any or all of the POS terminals 115, 120 and 125 (FIG. 1). The POS terminal 250 comprises a control device 252 that is in communication via a communication medium 254 (e.g. a serial port cable) with a system 256 for printing coupons. The control device 252 comprises a processor 260 in communication with a keypad 262, a card reader 264, a bar code scanner 266 and a display device 268. The system 256 for printing coupons comprises a processor 270 in communication with a storage device 272 and a printer 274. In this embodiment the control device 252 may be a cash register, and the system 256 may be an electronic device for printing coupons in accordance with data received from the cash register. For example, the control device 252 may be IBM 4690 running IBM SUREPOS ACE software and the system 256 may be a Lexmark printer embedded with Catalina coupon software. Other configurations of POS terminals will be understood by those skilled in the art.

Figure 2C:
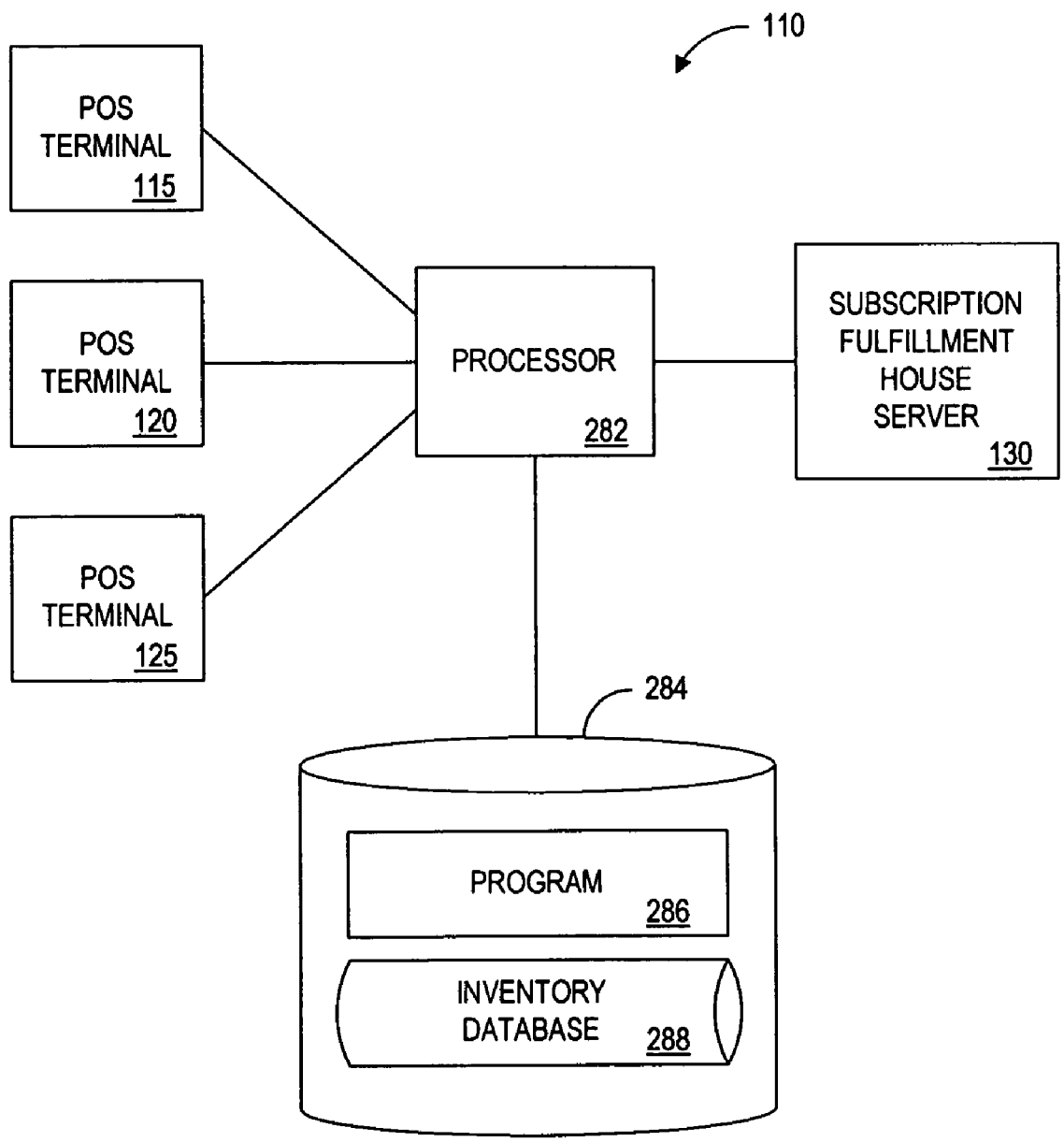
FIG. 2C is a schematic illustration of a store server of the apparatus of FIG. 1.

FIG. 2C illustrates an embodiment of the store server 110 (FIG. 1). The store server 110 comprises a processor 282, such as one or more Pentium® microprocessors. The processor 282 is in communication with a data storage device 284. The data storage device 284 comprises an appropriate combination of magnetic, optical and/or semiconductor memory, and may include Random Access Memory (RAM), Read-Only Memory (ROM) and/or a hard disk. The processor 282 and the storage device 284 may each be (i) located entirely within a single computer or other computing device; (ii) connected to each other by a remote communication medium such as a serial port cable, telephone line or radio frequency transceiver; or (iii) a combination thereof. In one embodiment the store server 110 may comprise one or more computers that are connected to a remote server computer for maintaining databases.

The data storage device 284 stores a program 286 for controlling the processor 282. The processor 282 performs instructions of the program 286 and thereby operates in accordance with the present invention, particularly in accordance with the methods described in detail herein. The program 286 furthermore includes program elements that may be necessary such as an operating system and "device drivers" for allowing the processor 282 to interface with computer peripheral devices such as input devices and output devices. Appropriate device drivers and other necessary program elements are known to those skilled in the art and need not be described in detail herein.

The storage device 284 also stores an inventory database 288. The inventory database 288 may be a "master copy" that is copied to each POS terminal in communication with the store server 110. Thus, inventory information stored by the store server 110 may be readily disseminated to each POS terminal. In another embodiment, the store server alone may maintain the inventory information in the inventory database 288, while each POS terminal would request appropriate inventory information from the store server 110 without actually having a local copy of the inventory database.

Figure 3:
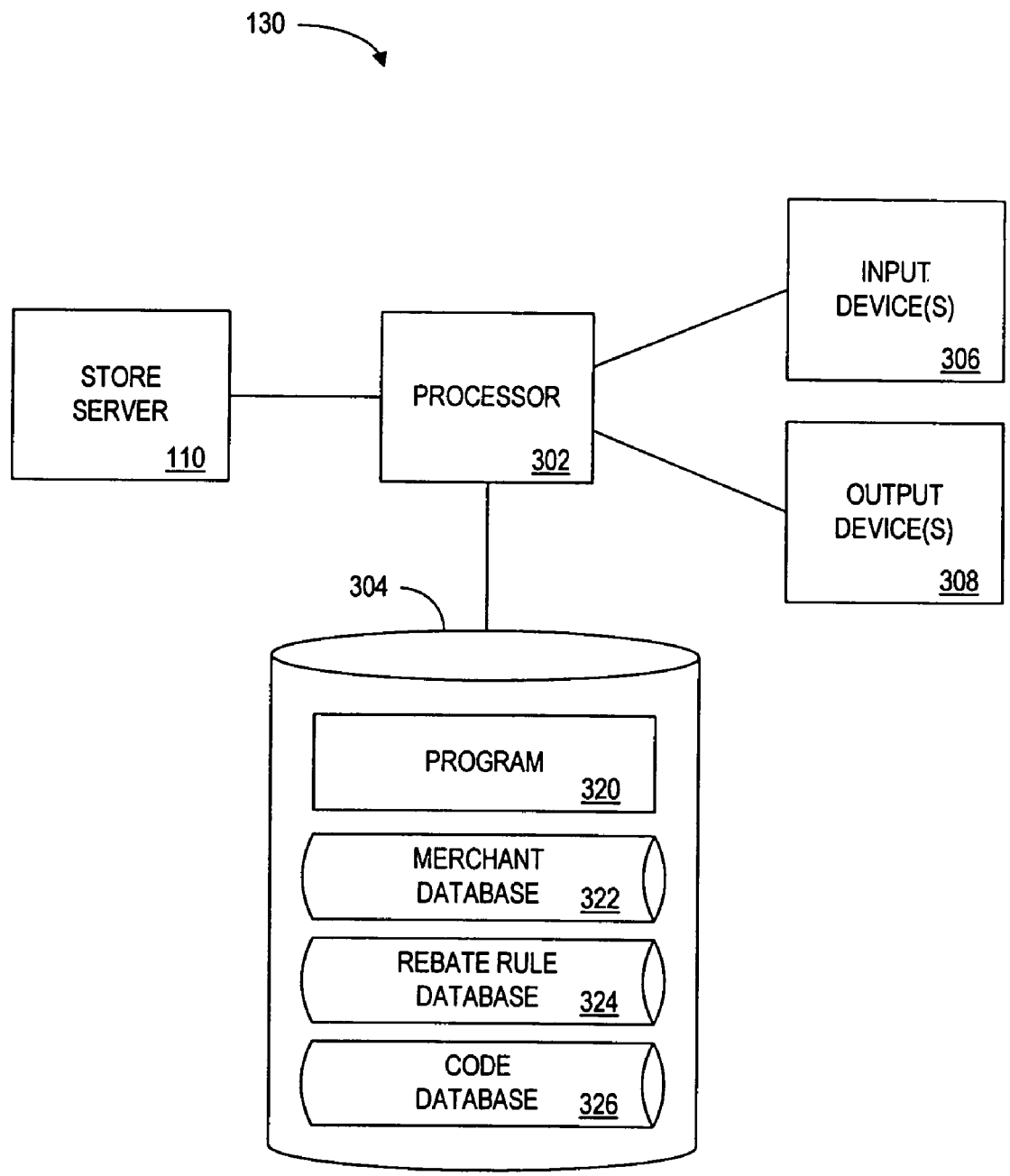
FIG. 3 is a schematic illustration of a subscription fulfillment house server of the apparatus of FIG. 1.

FIG. 3 illustrates an embodiment of the subscription fulfillment house server 130 (FIG. 1). The subscription fulfillment house server 130 comprises a processor 302, such as one or more Pentium® microprocessors. The processor 302 is in communication with a data storage device 304. The data storage device 304 comprises an appropriate combination of magnetic, optical and/or semiconductor memory, and may include Random Access Memory (RAM), Read-Only Memory (ROM) and/or a hard disk. The processor 302 and the storage device 304 may each be (i) located entirely within a single computer or other computing device; (ii) connected to each other by a remote communication medium such as a serial port cable, telephone line or radio frequency transceiver; or (iii) a combination thereof. In one embodiment, the subscription fulfillment house server 130 may comprise one or more computers that are connected to a remote server computer for maintaining databases.

The processor 302 may be in communication with one or more input devices 306 such as a keypad operative to transmit input signals to the processor 302. Similarly, the processor 302 may be in communication with one or more output devices 308 such as a display device that is controlled by the processor 302.

The data storage device 304 stores a program 320 for controlling the processor 302. The processor 302 performs instructions of the program 320, and thereby operates in accordance with the present invention, and particularly in accordance with the methods described in detail herein. The program 320 furthermore includes program elements that may be necessary such as an operating system and "device drivers" for allowing the processor 302 to interface with computer peripheral devices such as input devices and output devices. Appropriate device drivers and other necessary program elements are known to those skilled in the art and need not be described in detail herein.

The storage device 304 also stores (i) a merchant database 322, (ii) a rebate rule database 324, and (iii) a code database 326. Information stored in the databases 322, 324 and 326 may be made available to the store server 110 and/or the POS terminals 115, 120 and 125. Alternatively, the databases 322, 324 and 326 may be stored on the store server 110. The databases 322, 324 and 326 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Figure 4:
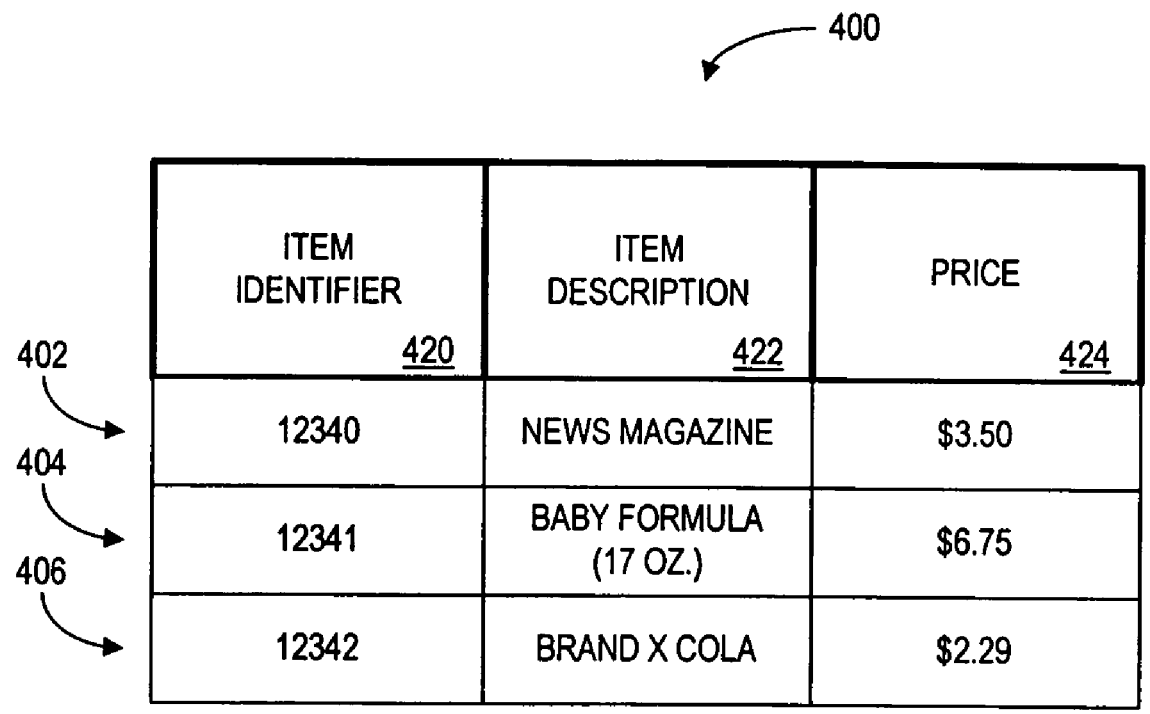
FIG. 4 is a tabular representation of an inventory database of the POS terminal of FIGS. 2A and 2B.

Referring to FIG. 4, a table 400 represents an embodiment of the inventory database 222 (FIG. 2A). The table 400 includes entries 402, 404 and 406, each defining an item of inventory that a merchant offers for sale. Typically, each of a plurality of merchants will have its own inventory database. Those skilled in the art will understand that the table 400 may include any number of entries. The table 400 also defines fields for each of the entries 402, 404 and 406. The fields specify (i) an item identifier 420 that uniquely identifies the item, (ii) a description 422 of the item, and (iii) a price 424 of the item.

Referring to FIG. 5, a table 500 represents an embodiment of the merchant database 322 (FIG. 3). The table 500 includes entries 502, 504, 506 and 508, each defining a merchant that is in communication with the subscription fulfillment house server 130. Those skilled in the art will understand that the table 500 may include any number of entries. The table 500 also defines fields for each of the entries 502, 504, 506 and 508. The fields specify (i) a merchant identifier 520 that uniquely identifies the merchant, (ii) a merchant name 522, (iii) a merchant account identifier 524 that identifies an account which may be used to transfer funds to or receive funds from the merchant, and (iv) an amount of funds owed 526 to the merchant by the subscription fulfillment house. As described below, in one embodiment such funds owed may be due to rebates that the merchant will provide on behalf of the subscription fulfillment house.

Referring to FIG. 6, a table 600 represents an embodiment of the rebate rule database 324 (FIG. 3). The table 600 includes entries 602, 604, 606 and 608, each defining a rebate rule that specifies when a rebate is to be offered to a customer. As described below, rebates are offered via POS terminals that are (directly or indirectly) in communication with the subscription fulfillment house server 130 (FIG. 1). Those skilled in the art will understand that the table 600 may include any number of entries. The table 600 also defines fields for each of the entries 602, 604, 606 and 608. The fields specify (i) a rebate rule identifier 620 that uniquely identifies the rebate rule; (ii) an item identifier 622 that identifies an item which, when purchased, triggers an offer for a rebate; (iii) a rebate amount 624 that defines an amount of money to be paid to the customer if the customer subscribes to a specified periodical; (iv) a required subscription 626 that defines, for example, the required periodical and subscription term necessary to receive the rebate amount; (v) a rebate message 628 that the POS terminal outputs when a rebate is to be offered; and (vi) a contact identifier 630 that specifies a telephone number, email address and/or Uniform Resource Locator (URL) which the customer may use to purchase a subscription to the specified periodical.

Figure 7:
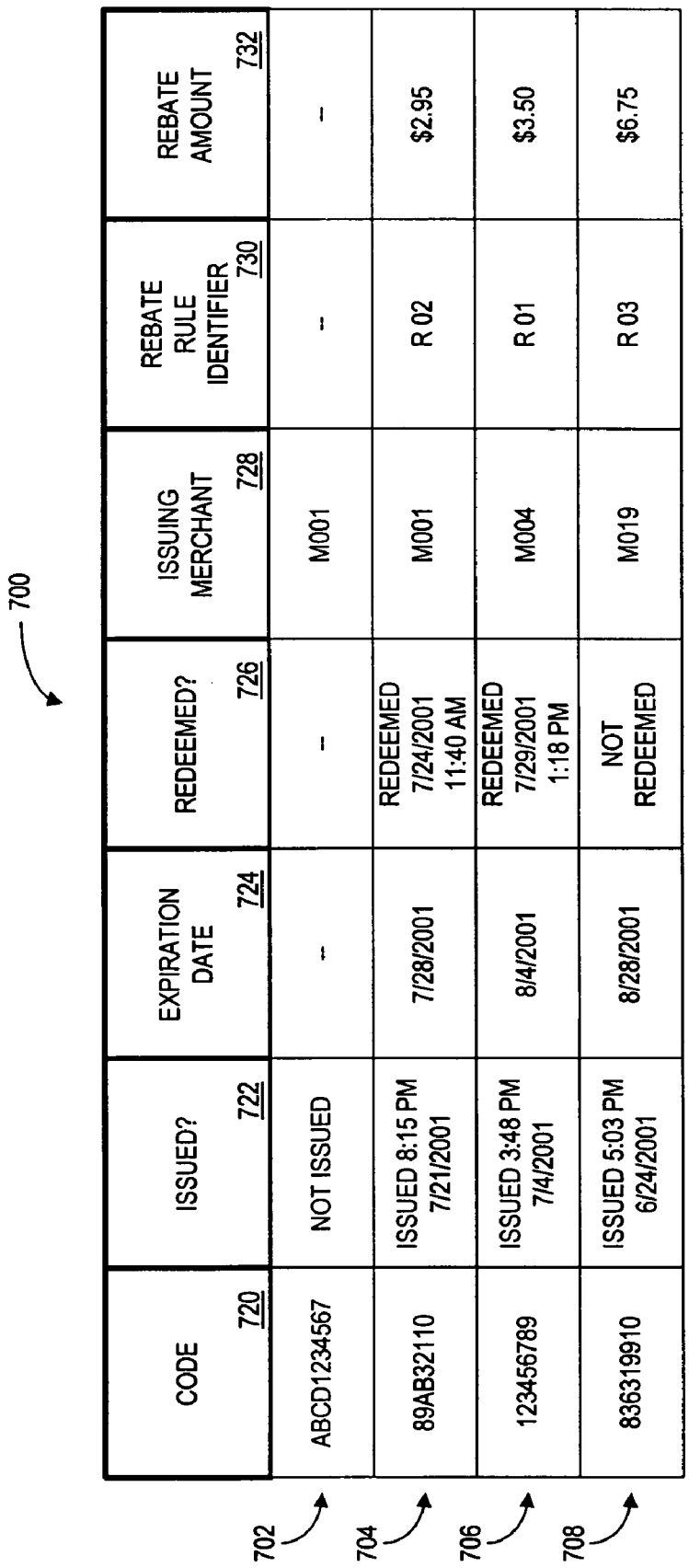
FIG. 7 is a tabular representation of an embodiment of a code database of the subscription fulfillment house server of FIG. 3.

Referring to FIG. 7, a table 700 represents an embodiment of the code database 326 (FIG. 3). The table 700 includes entries 702, 704, 706 and 708, each defining a code that may be provided with an offer for a rebate to a customer and in turn redeemed by the customer when the customer subsequently purchases a subscription to a periodical. Those skilled in the art will understand that the table 700 may include any number of entries. The table 700 also defines fields for each of the entries 702, 704, 706 and 708. The fields specify (i) a code identifier 720 that uniquely identifies the code, (ii) an indication of whether the code has been issued 722 (i.e. whether the code is associated with an offer for a rebate) and if so when, (iii) an expiration date 724 that defines a time period after which the offer for the rebate is no longer valid, (iv) an indication of whether the code has been redeemed 726 (i.e. whether the rebate has been provided to the customer) and if so when, (v) an issuing merchant 728, (vi) a rebate rule identifier 730 that identifies the rebate rule that specified the rebate (if any) associated with the code, and (vii) a rebate amount 732. Other types of information may be stored in the code database 326. For example, entries of the code database 326 may specify the item purchased by the customer receiving the offer for the rebate, a credit card number used to pay for the item, the required periodical the customer must subscribe to in order to redeem the code, and a customer identifier (e.g. credit card number, frequent shopper number) that uniquely identifies the customer.

As described herein, when the customer purchases the item from the issuing merchant, the code is provided to the customer (e.g. the code is printed on a receipt). Thereafter, the code may be redeemed in purchasing a subscription to a periodical. In one embodiment, the code may only be redeemed during a period of validity, such as between the date of issue and the expiration date.

In the embodiment of the code database 326 illustrated in FIG. 7, each entry defines a code that may or may not be issued. In such an embodiment, there may be a set of predetermined codes, and codes are issued as needed. For example, the entry 702 specifies a code that has not been issued, as indicated by the corresponding field 722.

In another embodiment codes need not be allocated from a set of predetermined codes. Codes may instead be generated as needed. In such an embodiment, each entry of the code database 326 could define a code that has been generated and that represents an offered rebate.

In still another embodiment, codes may be generated by encrypting at least one datum. Data that are encrypted to generate the code may include information that is represented in the code database of FIG. 7. In such an embodiment, it may not be necessary to have a code database that stores such data since the code itself would store the data. For example, the code database in such an embodiment may only store for each code an indication of whether the code has been redeemed.

In the embodiment of the code database 326 illustrated by FIG. 7, the customer received the rebate amount upon using the code in purchasing a subscription. In another embodiment described below, the customer may receive the rebate amount a significant time after the code is used in purchasing a subscription. In such an embodiment, the code could be considered redeemed when the customer receives the rebate amount.

Referring to FIG. 8, a table 800 represents another embodiment of the code database 326 (FIG. 3). In the illustrated embodiment, each of entries 802, 804, 806 and 808 defines a code that may be provided with an offer for a rebate to a customer. Each code may be used in purchasing a subscription, and then the rebate amount is provided at a time that is possibly well after the subscription is purchased. Those skilled in the art will understand that the table 800 may include any number of entries. The table 800 also defines fields for each of the entries 802, 804, 806 and 808. The fields specify (i) a code identifier 820 that uniquely identifies the code, (ii) an indication of whether the code has been issued 822 (i.e. whether the code is associated with an offer for a rebate) and if so when, (iii) an expiration date 824 that defines a time period after which the offer for the rebate is no longer valid, (iv) an indication of whether the required subscription was purchased 826 and if so when, (v) an indication of whether the code has been redeemed 828 (i.e. whether the rebate has been provided to the customer) and if so when, (vi) an issuing merchant 830, (vii) a rebate rule identifier 832 that identifies the rebate rule that specified the rebate (if any) associated with the code, and (viii) a rebate amount 834.

Figure 9:
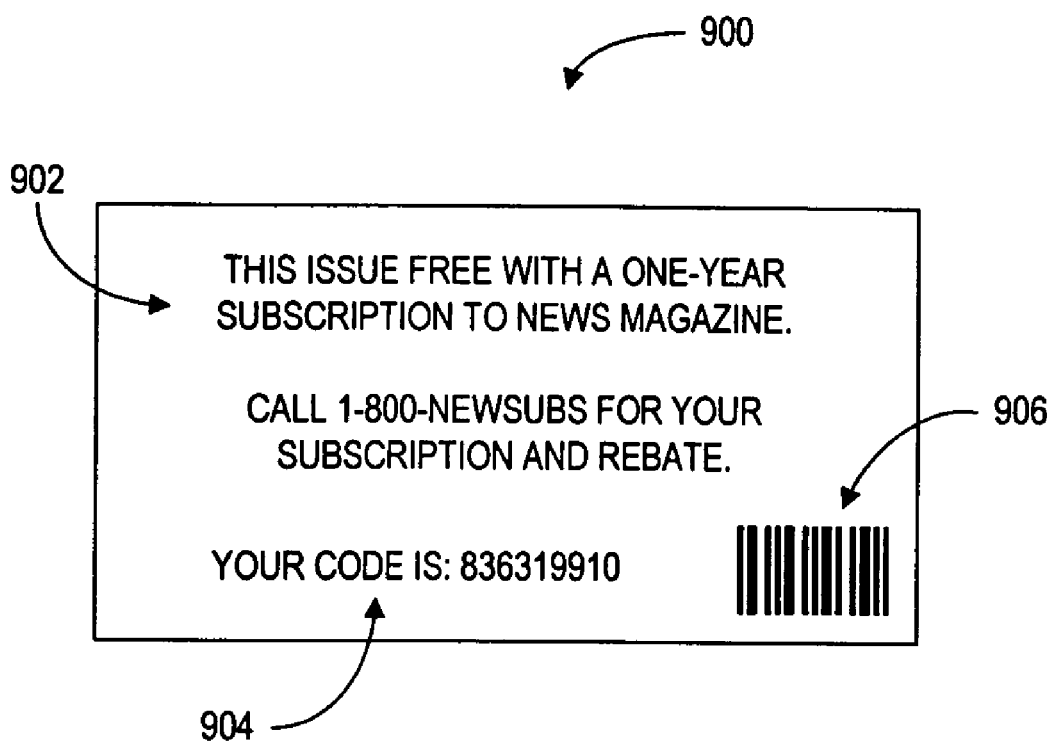
FIG. 9 is a front plan view of a coupon printed in accordance with the present invention.

Referring to FIG. 9, a coupon 900 that is printed in accordance with the present invention includes indicia 902 that represent a message, indicia 904 that represent a code and indicia 906 in the form of a bar code. The coupon 900 may be printed on a receipt by a POS terminal in a manner apparent to those skilled in the art. The message can generally describe the offer for a rebate in exchange for establishing a subscription to a periodical. The message may provide information such as a contact identifier and a required periodical. The bar code may represent, for example, the code.

Referring to FIG. 10, a table 1000 represents charges and credits made to an exemplary credit card account. The exemplary account is identified by credit card account number 1002. Entries 1004, 1006 and 1008 each define a transaction (charge or credit) to the account. Those skilled in the art will understand that the table 1000 may include any number of entries. The table 1000 also defines fields for each of the entries 1004, 1006 and 1008. The fields specify (i) a description 1020 of the transaction, for example a merchant from which a purchase was made; (ii) a date 1022 of the transaction; and (iii) an amount 1024 of the transaction.

The exemplary account represented by table 1000 illustrates a purchase at "Merchant Q" of $22.89 (entry 1004), a subsequent subscription to News Magazine for $12.95 (entry 1006), and a rebate of $3.50 which is the issue price of an issue previously purchased at "Merchant Q" (entry 1008).

The description of each transaction may be generated by the party receiving the credit card account number and processing the account transaction. For example, the subscription fulfillment house server 130 may generate a textual description of the rebate amount, and this textual description would be printed on a billing statement of the credit card account. Thus, the customer would be better informed as to the nature of the credit. Such a textual description of the rebate amount could include an indication of the periodical subscribed to, the item that was previously purchased, and/or a merchant from which the item was previously purchased.

Figure 11:
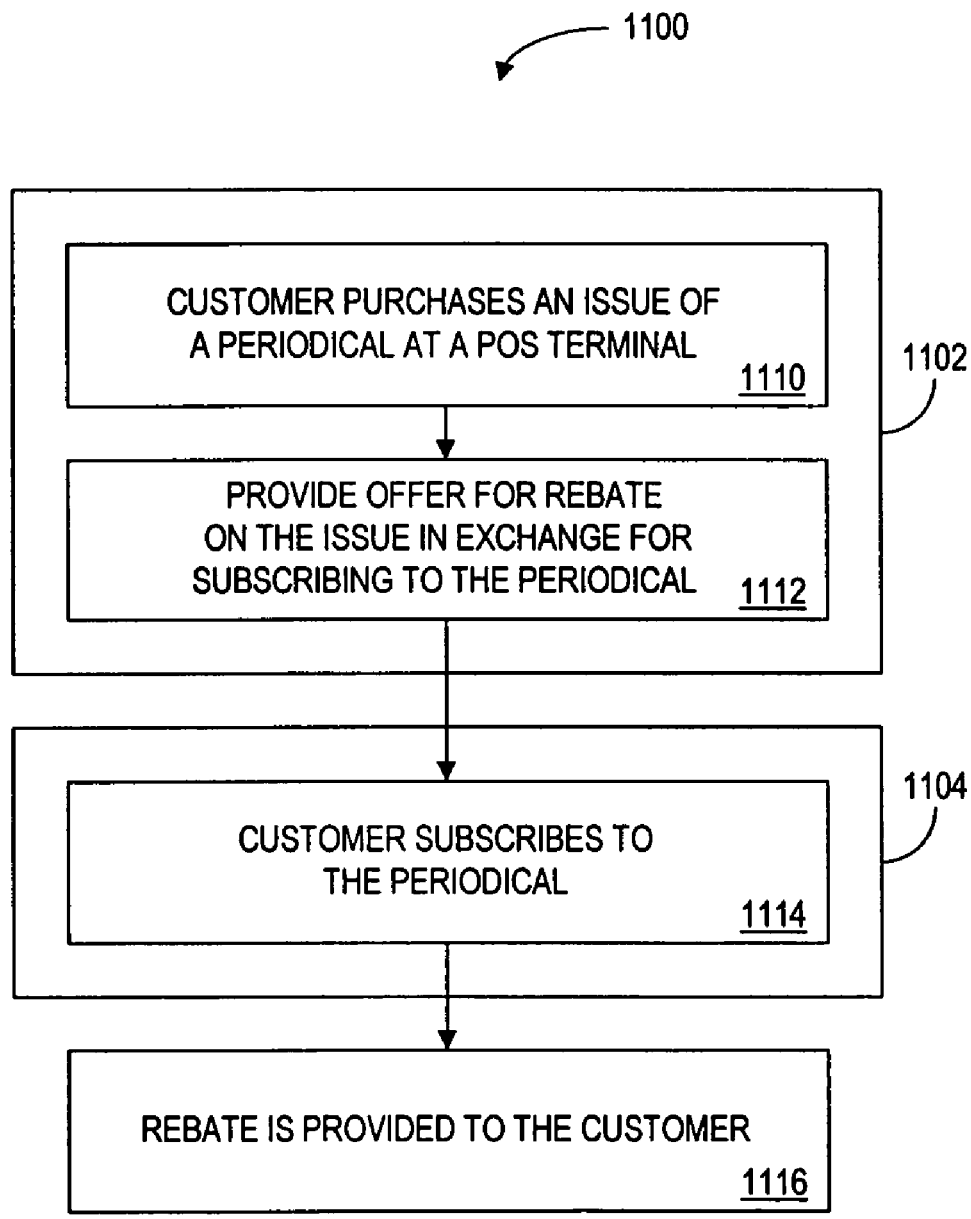
FIG. 11 is a flow chart illustrating an embodiment of a method for facilitating the sale of a subscription to a periodical in accordance with the present invention.

Referring to FIG. 11, a flow chart 1100 illustrates an embodiment of a method for facilitating the sale of a subscription to a periodical in accordance with the present invention. A first stage 1102 of the method occurs at a POS terminal, e.g., in a retail store. A second stage 1104 occurs subsequently and at a different location.

At the POS terminal, the customer purchases an issue of a periodical (step 1110). The customer is then provided with an offer for a rebate on the issue in exchange for subscribing to the periodical (step 1112). Subsequently, the customer subscribes to the periodical (step 1114) and the rebate is provided to the customer (step 1116).

Figure 12:
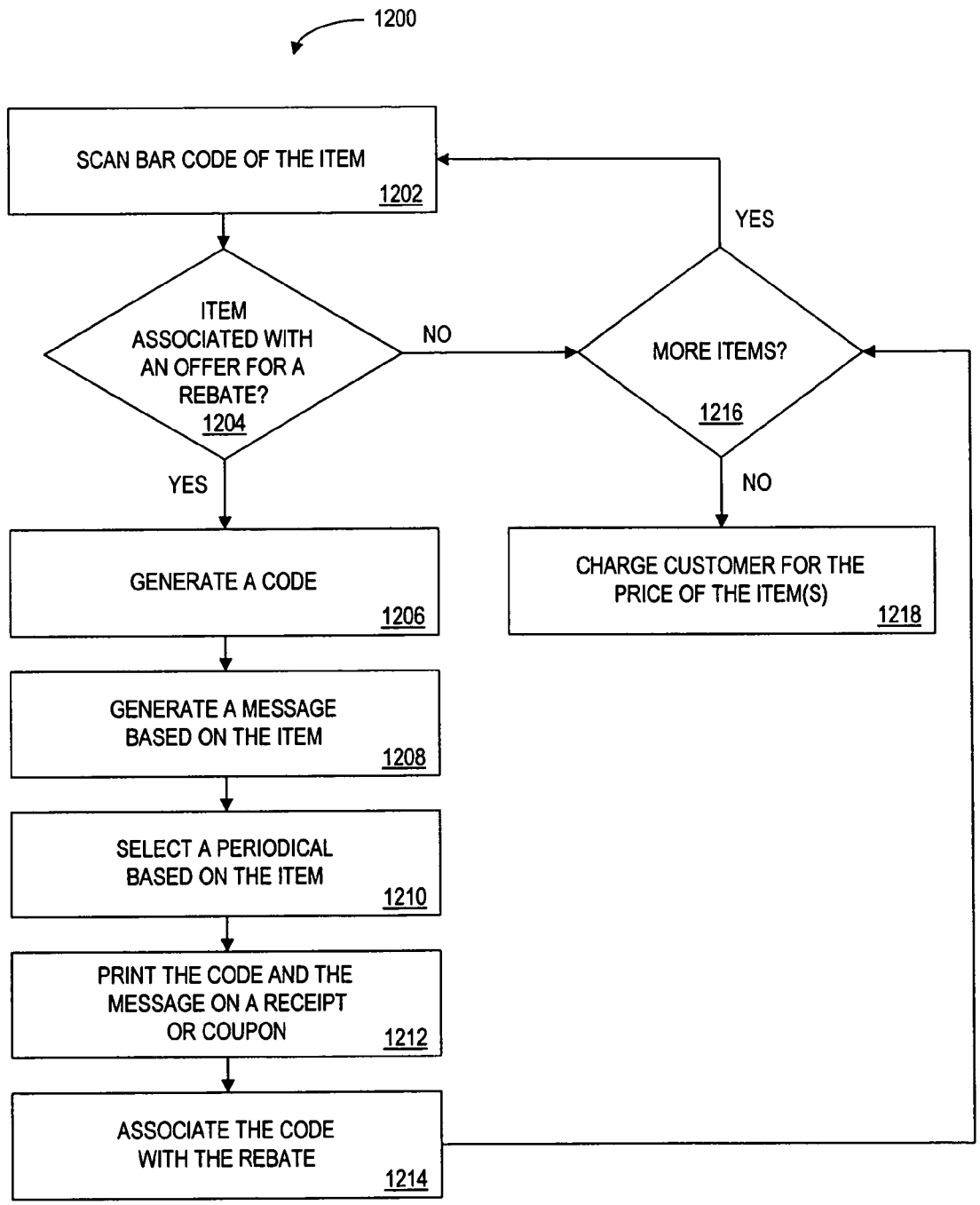
FIG. 12 is a flow chart illustrating an embodiment of a method for providing an offer for a rebate on an item in exchange for subscribing to a periodical.

Referring to FIG. 12, a flow chart 1200 illustrates an embodiment of a method for providing an offer for a rebate on an item in exchange for subscribing to a periodical. The illustrated method corresponds generally to steps 1110 and 1112 of FIG. 11.

The bar code of an item the customer desires to purchase is scanned (step 1202). Typically, the POS includes a bar code scanner that optically scans a bar code of the item, generates a signal that indicates the item, and transmits the signal to the processor and/or data storage device of the POS terminal. The POS terminal then ascertains whether the item is associated with an offer for a rebate (step 1204). The POS terminal may search a database (e.g. the rebate rule database 324) for a record (e.g. an entry such as the entry 602 of FIG. 6) that corresponds to the item, and then ascertain from the record whether the item is associated with an offer for a rebate. For example, if there is no record in the database that corresponds to the item, then the item is not associated with an offer for a rebate. The POS terminal may search either a database stored locally thereon, or a database of a remote device such as a store server or the subscription fulfillment house server. Those skilled in the art will realize further ways to ascertain whether the item is associated with an offer for a rebate.

In addition to ascertaining whether the item is associated with an offer for a rebate, in one embodiment the POS terminal may further ascertain whether any of a number of predetermined rules are satisfied. For example, rules may define time restrictions (e.g. must be early morning) or total purchase price restrictions (e.g. total price>$20.00). If the rule or rules are satisfied, then the code may be generated as described below.

If the item is associated with an offer for a rebate, then a code is generated (step 1206). In one embodiment, the code is generated randomly. For example, a code may comprise twenty randomly generated digits or alphanumeric characters. In another embodiment, the code may be selected from a plurality of predetermined codes. For example, the table 700 represents an embodiment of the code database 326 in which a plurality of predetermined codes are either issued or not issued. Codes that are not issued are free for selection.

In still another embodiment, the code may be generated by encrypting one or more data. Then the data could be determined from the code without reference to the code database 326 (FIG. 3). For example, the POS terminal may encrypt an identifier that indicates the periodical, an item price of the item, an account identifier, a merchant identifier that identifies the merchant selling the item, a period of validity of the code, an item identifier that identifies the item, and/or a customer identifier that identifies the customer. Several encryption techniques known to those skilled in the art such as a block cipher technique may be used to encrypt data to form a code. Encryption techniques are described in "Applied Cryptography: Protocols, Algorithms, and Source Code in C", by Bruce Schneier.

A message is generated based on the item (step 1208). In one embodiment, the message is selected from a plurality of predetermined messages. For example, the rebate rule database 324 includes entries that specify for each rebate rule an item and a corresponding message. Purchase of the item triggers a rebate rule and thus specifies a message.

A periodical is also selected based on the item (step 1210). In one embodiment, the rebate rule database 324 includes entries that specify for each rebate rule an item and a corresponding required periodical. Purchase of the item triggers a rebate rule and thus specifies a required periodical.

The POS terminal includes a printer that prints the code and the message on a receipt or a coupon (step 1212). Alternatively, the POS terminal may display the message, for example, on a video monitor. The code is associated with the rebate (step 1214). In one embodiment, the code is associated with the rebate by creating an appropriate entry in the code database 326 that includes the code and information about the rebate. Thus, the rebate may be determined from the code.

At step 1216, it is determined whether there are more items to scan. For example, a cashier operating the POS terminal may press a "SUBTOTAL" or similar key to indicate that there are no more items. If there are more items, then the bar code of the next item is scanned (step 1202). If there are not any more items, then the customer is charged for the price of the item(s). The customer typically pays by using cash, a check or a credit card account.

Figure 13:
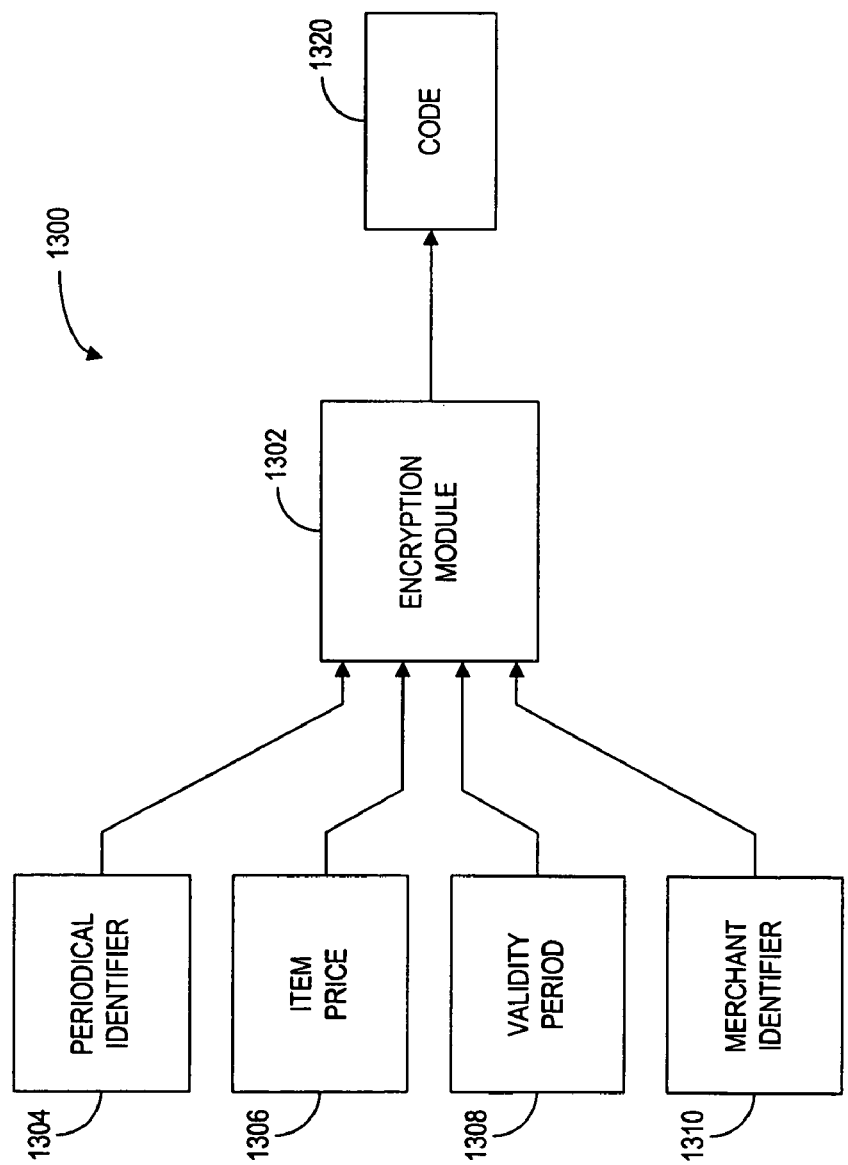
FIG. 13 is a diagram illustrating a method for generating a code.

Referring to FIG. 13, a diagram 1300 schematically illustrates a method for generating a code by encrypting various data. Those skilled in the art will understand various ways to implement an encryption module 1302 in hardware and/or software. The encryption module 1302 encrypts a periodical identifier 1304, an item price 1306, a validity period 1308 and a merchant identifier 1310 to generate a code 1320.

Figure 14:
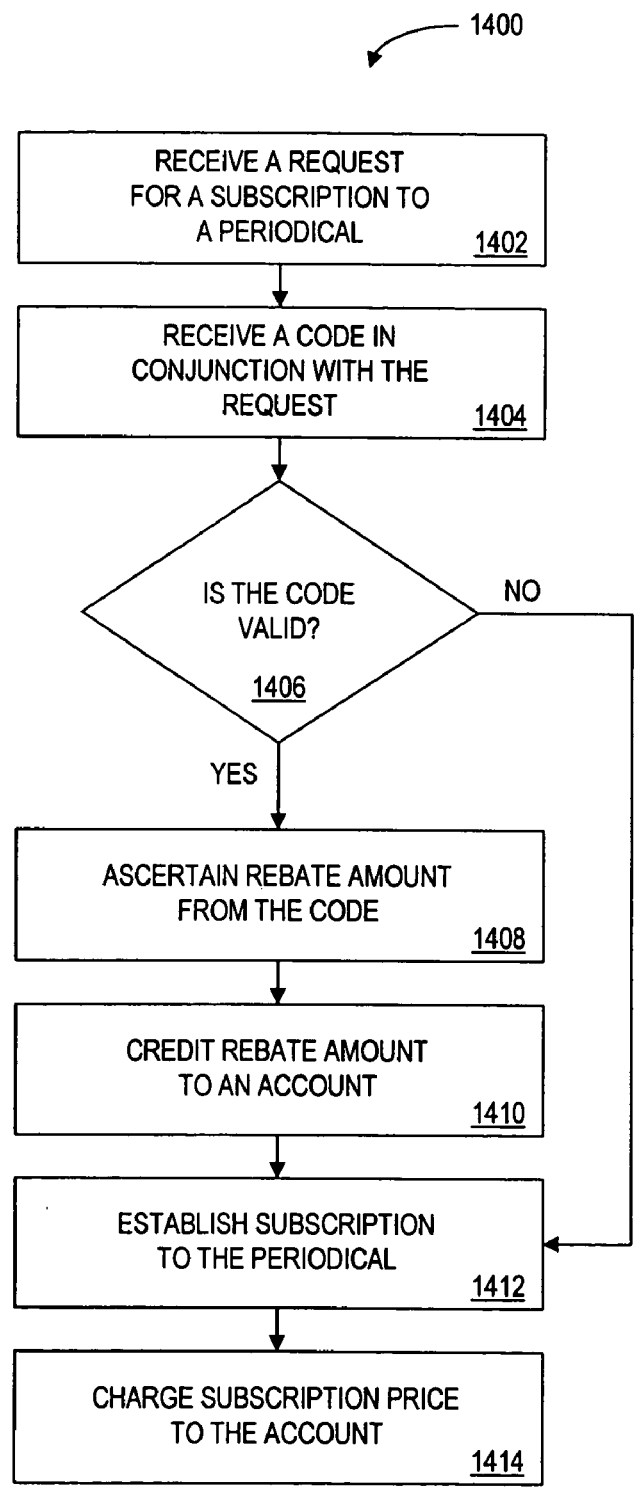
FIG. 14 is a flow chart illustrating an embodiment of a method for establishing a subscription and obtaining a rebate.

Referring to FIG. 14, a flow chart 1400 illustrates an embodiment of a method for establishing a subscription and obtaining a rebate. The illustrated method corresponds generally to the step 1114 of FIG. 11.

A request for a subscription to a periodical is received (step 1402). For example, the customer may use a telephone to access an interactive voice response unit (IVRU) that processes the request. Such an IVRU may be controlled by the subscription fulfillment house server 130 (FIG. 1). The customer may also communicate with an operator who in turn enters the request into a terminal that is in communication with the subscription fulfillment house server 130. Alternatively, the request may be received via a web server that receives requests via the Internet. Such a web server may interact with customers via electronic mail or via a form on a web site that is controlled by the web server.

A code is also received in conjunction with the request (step 1404). The code may be entered in the same way as the request. For example, in an IVRU embodiment, the IVRU may prompt the customer to enter the code by using the buttons of his telephone. In such an embodiment, actuating the buttons of the telephone would cause dual tone multi-frequency (DTMF) signals to be generated and transmitted to the IVRU.

In still another embodiment, the code and the request may be received via postal mail. For example, a receipt may have printed thereon a form for requesting a subscription to a periodical, as well as the code. Such a receipt could be printed during the transaction in which the issue of the periodical was purchased. The code or indicia on the receipt could indicate a means of payment (e.g. a credit card number). Alternatively, a check could be mailed in with the receipt.

The subscription fulfillment house server 130 then ascertains whether the code is valid (step 1406). In one embodiment, ascertaining whether the code is valid comprises searching for the code in the code database 326 to determine whether the code has been issued. It can also be desirable to ascertain whether the code corresponds to the periodical. If the code corresponds to another periodical, then the instant request for a subscription does not fulfill the requirements of the code. The code database can likewise indicate a required periodical that corresponds to the code. For example, the entry 706 (FIG. 7) indicates that the rebate rule "R01" corresponds to the code "123456789". The rebate rule "R01" in turn corresponds to the required subscription "News Magazine for at least a twelve month term", as indicated by the entry 602.

Ascertaining whether the code is valid may also comprise ascertaining whether the code is at least one of a set of predetermined codes. For example, the code database 326 may be searched to determine if the code is specified by any entry thereof. In another embodiment, the code may be evaluated to ascertain whether the code has certain features. For example, only codes that include seventeen digits and are divisible by a certain number are valid.

Ascertaining whether the code is valid may also comprise ascertaining a period of validity of the code, and ascertaining whether the period of validity has elapsed. For example, the code database 326 may be searched to determine an expiration date of the code. The expiration date would indicate an end of the period of validity. The period of validity would be elapsed if the current date were after the expiration date. The current date may be maintained by the processor of the POS terminal and/or the processor of the subscription fulfillment house server.

Ascertaining whether the code is valid may also comprise decrypting the code using any of a number of known decryption techniques described, e.g., in "Applied Cryptography: Protocols, Algorithms, and Source Code in C", by Bruce Schneier. By decrypting the code, various types of information may be ascertained from the code. For example, decrypting the code can yield the periodical, an item price of at least one item, an account, a merchant identifier that identifies a merchant, a period of validity, an item identifier that identifies the at least one item, and/or a customer identifier that identifies a customer.

If the code is valid, a rebate amount is ascertained from the code (step 1408). The rebate amount may be ascertained by decrypting the code, as described above. Alternatively, the code may correspond to a rebate amount in the code database 326. For example, the entry 708 of FIG. 7 indicates that the code "836319910" corresponds to a rebate amount of $6.75. The rebate amount is credited to an account (step 1410) such as a credit card account that is indicated by a credit card number provided by the customer.

A subscription to the periodical is established for the customer (step 1412) in a manner known in the art. Thus, the customer will be mailed issues periodically. The subscription price is likewise charged to the account (step 1414).

Figure 15:
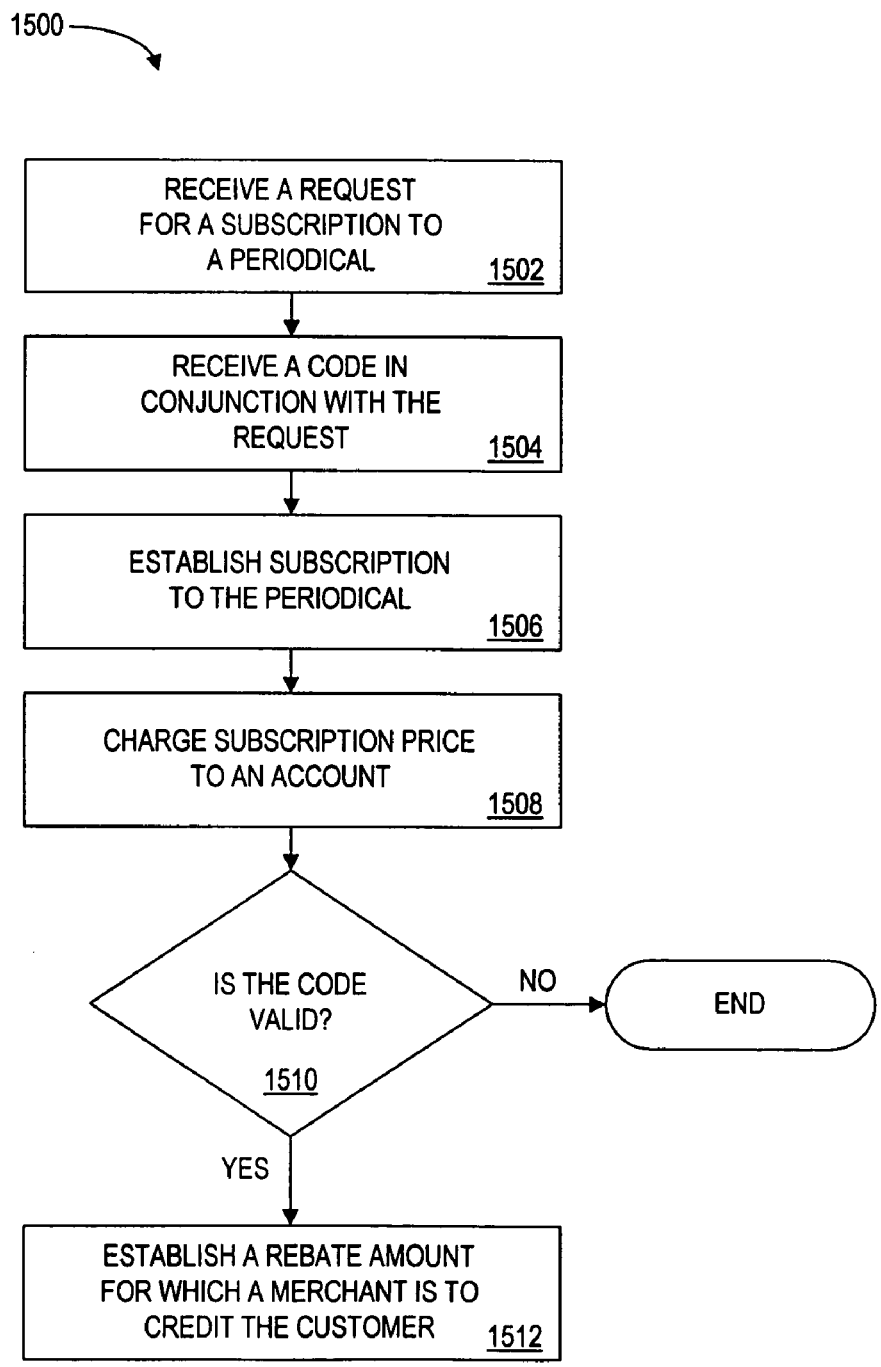
FIG. 15 is a flow chart illustrating an embodiment of a method for establishing a subscription and establishing a rebate to be provided by a merchant.

Referring to FIG. 15, a flow chart 1500 illustrates an embodiment of a method for establishing a subscription and establishing a rebate to be provided by a merchant. The flow chart 1500 is generally similar to the flow chart 1400. Rather than crediting the rebate amount to the customer's account, however, the rebate will be applied to a customer account by the merchant at a later time.

As described above, a request for a subscription to a periodical is received (step 1502) form a customer, and a code is also received in conjunction with the request (step 1504). A subscription to the periodical is established for the customer (step 1506) in a manner known in the art. The subscription price is likewise charged to an account (step 1508) such as a credit card account.

If it is ascertained at step 1510 that the code is valid, then the subscription fulfillment house server 130 (FIG. 1) establishes a rebate amount for which a merchant is to credit the customer (step 1512). Establishing the rebate amount may comprise making an appropriate entry in a database such as the code database. For example, referring again to FIG. 8, the entry 806 defines a code "998877665" that was used at 11:23 AM on Aug. 21, 2001 in conjunction with the request and purchase of a subscription. This code also defines a rebate amount of $6.75 that is to be credited to the customer when the code is redeemed at a merchant "M001". When the code is redeemed (e.g. during a subsequent purchase), then the price charged for the subsequent purchase is reduced by the rebate amount of $6.75.

Figure 16:
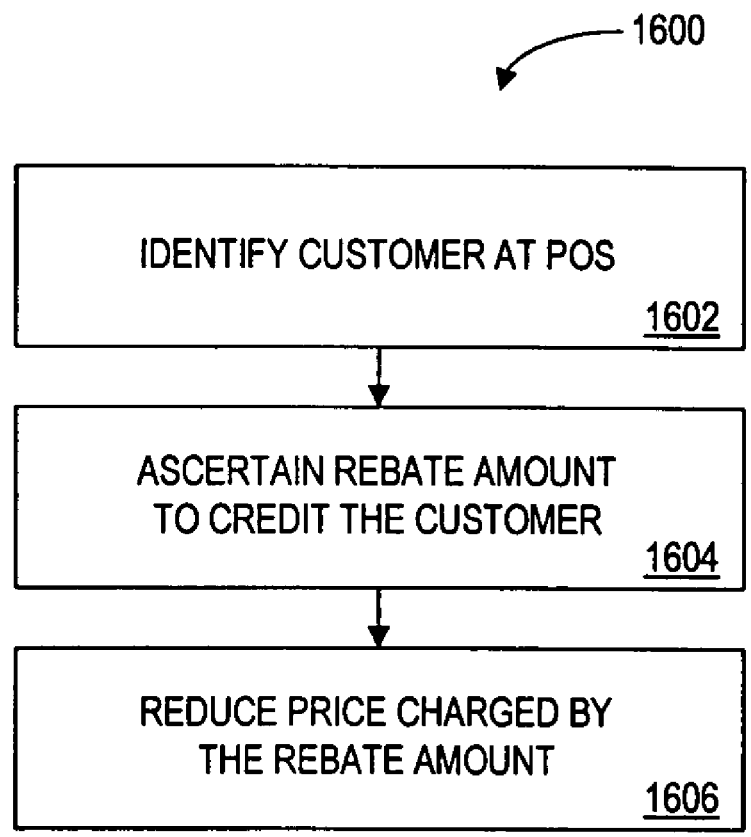
FIG. 16 is a flow chart illustrating an embodiment of a method for providing a rebate at a point of sale terminal.

Referring to FIG. 16, a flow chart 1600 illustrates an embodiment of a method for providing a rebate at a point of sale terminal of the merchant. The customer is identified at the point of sale (step 1602) in any of a number of ways. For example, the POS terminal may read a frequent shopper card or credit card of the customer. From the card, the POS terminal may determine a customer identifier such as a frequent shopper identifier or credit card number that uniquely identifies the customer.

In another embodiment, the customer may be identified by reading a coupon or receipt provided by the customer. The coupon may include indicia representing the code. For example, a bar code registered on the coupon may be read by a bar code scanner, which transmits a signal that represents the code to the POS terminal processor. As described above, such a coupon may have been provided to the customer when the customer purchased an item that triggered the rebate offer.

The POS terminal then ascertains a rebate amount to credit to the customer (step 1604). The rebate amount may be ascertained from the code, if any code is provided. As described above with reference to step 1512, the code database may indicate a rebate amount for each code. The rebate amount may also be associated with the customer identifier. For example, there may be a customer database, similar to the code database described above, which stores rebate amounts corresponding to each customer. From the database, it may be determined whether a subscription was established for the customer.

The price charged to the customer is then reduced by the rebate amount (step 1606). For example, if the customer purchases items that normally cost $14.00 and the rebate amount is $6.75, then the price charged is reduced to $7.25 ($14.00–$6.75=$7.25). The reduced price may be charged to an account of the customer (e.g. a credit card account). Alternatively, the price charged may reflect the combination of a $14.00 charge to the account and a $6.75 credit to the account. In another embodiment, the customer may pay the reduced price in other ways besides a using credit card account. For example, the customer may pay with cash or a check as is known to those skilled in the art.

Although the present invention has been described with respect to a preferred embodiment thereof, those skilled in the art will note that various substitutions may be made to those embodiments described herein without departing from the spirit and scope of the present invention. For example, the rebate amount need not be the price of the previously-purchased issue. In one embodiment the rebate amount may be based on the price of a plurality of issues. A parent case of the present application, U.S. Pat. application No. 09/136,147, entitled "METHOD AND APPARATUS FOR ESTABLISHING A SUBSCRIPTION TO A PERIODICAL", filed on Aug. 18, 1998, now abandoned describes a method and apparatus for providing free issues that may be incorporated with the present invention to provide free issues in exchange for establishing a subscription to a periodical.

What is claimed is:

1. A method, comprising:
   receiving a signal that indicates at least one item;
   ascertaining whether the at least one item is associated with an offer for a rebate;
   generating a code if the at least one item is associated with an offer for a rebate;
   outputting a signal that represents the code;
   outputting an offer for a rebate in exchange for establishing a subscription to a periodical, in which the subscription to the periodical is not the at least one item; and
   charging an item price.

2. The method of claim 1, in which the step of receiving the signal that indicates the at least one item comprises:
   receiving the signal via a bar code scanner.

3. The method of claim 1, in which the step of receiving the signal that indicates the at least one item comprises:
   optically scanning a bar code that indicates the at least one item.

4. The method of claim 1, in which the step of ascertaining whether the at least one item is associated with an offer for a rebate comprises:
   searching a database for a record that corresponds to the at least one item; and
   ascertaining from the record whether the at least one item is associated with an offer for a rebate.

5. The method of claim 1, in which the step of generating the code comprises:
   selecting the code from a plurality of predetermined codes.

6. The method of claim 1, in which the step of generating the code comprises:
   generating the code randomly.

7. The method of claim 1, in which the step of generating the code comprises:
   encrypting at least one datum.

8. The method of claim 7, in which the step of encrypting at least one datum comprises:
   encrypting at least one of
   the periodical,
   an item price of the at least one item,
   an account identifier,
   a merchant identifier that identifies a merchant,
   a period of validity,
   an item identifier that identifies the at least one item, and
   a customer identifier that identifies a customer.

9. The method of claim 1, in which the step of generating the code comprises:
   generating the code based on at least one of
   the periodical,
   an item price of the at least one item,
   an account identifier,
   a merchant identifier that identifies a merchant,
   a period of validity,
   an item identifier that identifies the at least one item, and
   a customer identifier that identifies a customer.

10. The method of claim 1, in which the step of outputting the signal that represents the code comprises:
    printing an indicium that represents the code.

11. The method of claim 10, in which the indicium comprises a machine-readable indicium.

12. The method of claim 11, in which the indicium comprises a bar code.

13. The method of claim 1, in which the step of outputting an offer comprises:
    generating a message.

14. The method of claim 13, in which the step of outputting an offer comprises:
    printing an indicium that represents a message.

15. The method of claim 13, in which the step of outputting an offer comprises:
    displaying a message on a video monitor.

16. The method of claim 13, in which the step of generating the message comprises:
    selecting the message based on the at least one item.

17. The method of claim 13, in which the step of generating the message comprises:
    selecting the message from a plurality of predetermined messages.

18. The method of claim 1, in which the charging the item price comprises:
    receiving a credit card number that identifies a credit card account; and
    charging the item price to the credit card account.

19. The method of claim 1, further comprising:
    printing an indicium that represents a contact identifier.

20. The method of claim 19, in which the indicium that represents the contact identifier represents at least one of a telephone number, an electronic mail address and a URL.

21. The method of claim 1, further comprising:
    selecting a contact identifier based on the at least one item.

22. The method of claim 1, further comprising:
    selecting the periodical based on the at least one item.

23. The method of claim 1, further comprising:
    ascertaining whether a predetermined rule is satisfied.

24. The method of claim 23, in which the step of outputting the signal that represents the code is performed only if the predetermined rule is satisfied.

25. The method of claim 1, further comprising:
    receiving a customer identifier that identifies a customer that purchases the at least one item.

26. The method of claim 25, in which the step of receiving a customer identifier comprises:
   receiving an account identifier that identifies an account.

27. The method of claim 26, in which the account identifier comprises a credit card account number and in which the account is a credit card account.

28. The method of claim 25, in which the step of receiving a customer identifier comprises:
   receiving the customer identifier via at least one of a card reader and a bar code scanner.

29. The method of claim 1, further comprising:
   associating the code with the rebate.

30. The method of claim 29, in which the step of associating the code with the rebate comprises:
   storing the code and an indication of the rebate in a record of a database.

31. The method of claim 1, in which the at least one item comprises an issue of the periodical.

32. The method of claim 1, in which the code indicates at least one of
   the periodical,
   an item price of the at least one item,
   an account identifier,
   a merchant identifier that identifies a merchant,
   a period of validity,
   an item identifier that identifies the at least one item, and
   a customer identifier that identifies a customer.

33. The method of claim 1, in which the code comprises a plurality of digits.

34. The method of claim 1, in which the code comprises a plurality of alphanumeric characters.

35. An apparatus, comprising:
   means for receiving a signal that indicates at least one item;
   means for ascertaining whether the at least one item is associated with an offer for a rebate;
   means for generating a code if the at least one item is associated with an offer for a rebate;
   means for outputting a signal that represents the code;
   means for outputting an offer for a rebate in exchange for establishing a subscription to a periodical, in which the subscription to the periodical is not the at least one item; and
   means for charging an item price.

36. A computer readable medium encoded with processing instructions for implementing a method, the processing instructions for directing a computer to perform the steps of:
   receiving a signal that indicates at least one item;
   ascertaining whether the at least one item is associated with an offer for a rebate;
   generating a code if the at least one item is associated with an offer for a rebate;
   outputting a signal that represents the code;
   outputting an offer for a rebate in exchange for establishing a subscription to a periodical, in which the subscription to the periodical is not the at least one item; and
   charging an item price.

37. An apparatus, comprising:
   a processor;
   a memory connected to the processor, the memory for storing a program for controlling the processor; and
   the processor operative with the program to:
      receive a signal that indicates at least one item;
      ascertain whether the at least one item is associated with an offer for a rebate;
      generate a code if the at least one item is associated with an offer for a rebate;
      output a signal that represents the code;
      output an offer for a rebate in exchange for establishing a subscription to a periodical, in which the subscription to the periodical is not the at least one item; and
      charge an item price.

* * * * *